US010518814B2

(12) United States Patent
Matsuoka et al.

(10) Patent No.: US 10,518,814 B2
(45) Date of Patent: Dec. 31, 2019

(54) VEHICLE BODY FRONT PART STRUCTURE

(71) Applicant: HONDA MOTOR CO., LTD., Tokyo (JP)

(72) Inventors: Kiyohiko Matsuoka, Wako (JP); Tomohito Kamada, Wako (JP); Isamu Nakanishi, Wako (JP); Akira Haga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/311,793

(22) PCT Filed: Jun. 22, 2017

(86) PCT No.: PCT/JP2017/023064
§ 371 (c)(1),
(2) Date: Dec. 20, 2018

(87) PCT Pub. No.: WO2017/222019
PCT Pub. Date: Dec. 28, 2017

(65) Prior Publication Data
US 2019/0225279 A1 Jul. 25, 2019

(30) Foreign Application Priority Data

Jun. 24, 2016 (JP) ................................. 2016-125678
Jun. 24, 2016 (JP) ................................. 2016-125680

(51) Int. Cl.
B62D 25/08 (2006.01)
B62D 25/20 (2006.01)
B62D 21/15 (2006.01)
B60R 21/34 (2011.01)

(52) U.S. Cl.
CPC ............. *B62D 25/08* (2013.01); *B62D 21/15* (2013.01); *B62D 25/084* (2013.01); *B62D 25/20* (2013.01); *B60R 2021/343* (2013.01)

(58) Field of Classification Search
CPC .... B62D 25/08; B62D 25/20; B60R 2021/343
USPC .......................... 296/187.09, 187.1, 203.02
See application file for complete search history.

(56) References Cited

FOREIGN PATENT DOCUMENTS

| JP | 2003-063445 A | 3/2003 |
| JP | 2003-205820 A | 7/2003 |
| JP | 2008-162369 A | 7/2008 |
| JP | 2012-046166 A | 3/2012 |

OTHER PUBLICATIONS

International Search Report by ISA/JP dated Aug. 1, 2017 on PCT/JP2017/023064 (3 pages).
Written Opinion by ISA/JP dated Aug. 1, 2017, on PCT/JP2017/023064 (3 pages).

*Primary Examiner* — Joseph D. Pape
*Assistant Examiner* — Dana D Ivey
(74) *Attorney, Agent, or Firm* — Rankin, Hill & Clark LLP

(57) ABSTRACT

Provided is a vehicle body front part structure including: a pair of left and right front side frames extending in a vehicle front-rear direction; and a front bulkhead connected to front end portions of the front side frames, wherein the front bulkhead includes a pair of upper and lower lateral frame parts extending in a left-right direction, and a pair of left and right vertical frame parts extending in an upper-lower direction to connect vehicle-width-direction outer end portions of the lateral frame parts.

15 Claims, 25 Drawing Sheets

VEHICLE BODY FRONT PART STRUCTURE

TECHNICAL FIELD

The present invention relates to a vehicle body front part structure.

BACKGROUND ART

An airbag system for protecting occupants in the event of a frontal collision is installed in conventional vehicles. The airbag system is configured to deploy an airbag to a vehicle compartment when a collision detection sensor set in a vehicle front detects a collision. Various proposals have been made about a position where to set the collision detection sensor because the position is important in detecting a collision of a vehicle in a short time to deploy the airbag quickly.

For example, Patent Literature 1 discloses an invention in which the collision detection sensor is set on a connection member for connecting a radiator shroud upper extending in a vehicle width direction, and a bumper reinforcement arranged obliquely frontward and downward from the radiator shroud upper. According to the invention disclosed in Patent Literature 1, in the event of a frontal collision of the vehicle, the collision detection sensor is capable of detecting the collision of the vehicle because the connection member is deformed toward a vehicle rear to move the collision detection sensor toward the vehicle rear.

The connection member of Patent Literature 1, however, may not be easily deformed in the event of a frontal collision of the vehicle, because the connection member is formed of a single member having a U-shape in a cross-sectional view and relative high rigidity. This inhibits an amount of movement toward the vehicle rear of the collision detection sensor set on the connection member. There is still room for improvement in quick collision detection. Specifically, the more easily a member on which to set the collision detection sensor is deformed, the more easily the sensor moves rearward to detect the collision more quickly. For this reason, the member on which to set the sensor needs to have deformability (low rigidity).

For the purpose of satisfying such need, Patent Literature 2 discloses an invention in which: left and right vertical frame parts forming a front bulkhead having a rectangular shape in a front view are made from panel material; and the collision detection sensor is set on the vertical frame parts. According to the invention disclosed in Patent Literature 2, since the vertical frame parts are formed from the panel material and their rigidity is relatively low, the vertical frame parts are easily deformed, and quick collision detection can be realized.

In a small overlap collision in which a collision object such as an oncoming vehicle collides at a position outward of a front side frame in the vehicle width direction, there is a case where a power unit including an engine and a transmission moves toward the vehicle front to hit a lower lateral frame part included in the front bulkhead. In this case, the rigidity of the vertical frame parts connected to the lower lateral frame part needs to be increased in order to support frontward load applied to the lateral frame part. In other words, the vertical frame parts need to have shape retainability (high rigidity).

CITATION LIST

Patent Literature

Patent Literature 1: JP 2003-205820 A1
Patent Literature 2: JP 2003-063445 A1

SUMMARY OF INVENTION

Technical Problem

The invention disclosed in Patent Literature 1 has difficulty in quick collision detection since the deformability of the connection member which is the member on which to set the sensor is insufficient.

Regarding the invention disclosed in Patent Literature 2, meanwhile, although the deformability of the vertical frame part which is the member on which to set the sensor is sufficient, the shape retainability of the vertical frame part is insufficient. Thus, frontward load applied to the lateral frame part in the event of a small overlap collision cannot be supported by the vertical frame part, and there is likelihood that the power unit moves further frontward.

Against a background like this, there have been demands for the development of a vehicle body front part structure having both deformability in which the member on which to set the sensor is easily deformable, and shape retainability in which the frontward load applied to the lateral frame part can be preferably supported.

Form the above viewpoint, an object of the present invention is to provide a vehicle body front part structure which has both deformability and shape retainability, as well as is capable of: detecting collision of a vehicle quickly; and inhibiting frontward movement of a power unit in the event of a small overlap collision.

Solution to Problem

To solve the above problems, the present invention is a vehicle body front part structure including: a pair of left and right front side frames extending in a vehicle front-rear direction; and a front bulkhead connected to front end portions of the front side frames. The front bulkhead includes: a pair of upper and lower lateral frame parts extending in a left-right direction; and a pair of left and right vertical frame parts extending in an upper-lower direction to connect vehicle-width-direction outer end portions of the lateral frame parts. The vertical frame parts are each formed by connecting a lower vertical frame part arranged on a lower side, and an upper vertical frame part arranged above the lower vertical frame part. The lower vertical frame part is fixed to the front end portion of the corresponding front side frame. A load transmission member projecting further toward a vehicle front than the upper vertical frame part, and a collision detection sensor arranged higher than the load transmission member are fixed to the upper vertical frame part.

According to the present invention, since the vertical frame parts are each formed by connecting the lower vertical frame part and the upper vertical frame part, strength of a boundary part between the lower and upper vertical frame parts is low, and a folded part (vulnerable part) can be set in a middle of the vertical frame part. In addition, since only the lower vertical frame part is connected to the corresponding front side frame, rigidity of the lower vertical frame part can be made higher than that of the upper vertical frame part. Furthermore, since the load transmission part projecting toward the vehicle front is fixed to the upper vertical frame part, collision load is easily transmitted to the upper vertical frame part. Thereby, the upper vertical frame part is easily deformed from the boundary part toward the vehicle rear in the event of a frontal collision of the vehicle. Accordingly, the collision detection sensor fixed to the upper vertical frame part can smoothly move toward the vehicle rear, and can detect the collision of the vehicle quickly.

Moreover, according to the present invention, since the lower vertical frame part with high rigidity is connected to the lower lateral frame part, frontward load applied to the lower lateral frame part can be preferably supported by the lower vertical frame part in the event of a small overlap collision. This makes it possible to inhibit further frontward movement of the power unit.

In other words, according to the present invention, the upper vertical frame part which is the member on which to set the collision detection sensor has excellent deformability, while the lower vertical frame part connected to the lateral frame part has excellent shape retainability. It is possible to realize the vehicle body front part structure having both the deformability and the shape retainability.

In addition, it is preferable that: the vertical frame part be a hollow member; and a hollow cross-sectional area of the upper vertical frame part in an extension direction of the upper vertical frame part be formed smaller than a hollow cross-sectional area of the lower vertical frame part in an extension direction of the lower vertical frame part.

In the case where the hollow cross-sectional area of the upper vertical frame part in the extension direction of the upper vertical frame part is formed smaller than the hollow cross-sectional area of the lower vertical frame part in the extension direction of the lower vertical frame part, the strength and rigidity of the upper vertical frame part is lower than those of the lower vertical frame part, and the upper vertical frame part is accordingly easy to deform.

Furthermore, it is preferable that: the load transmission member include a hat cross-sectional part which has a hat shape in a cross-sectional view in the upper-lower direction; and the hat cross-sectional part include a pair of upper and lower brim parts fixed to the upper vertical frame part, and a crown part arranged between the pair of brim parts and located away from the upper vertical frame part. It is preferable that the hat cross-sectional part be arranged extending in the vehicle front-rear direction in a way that makes the crown part face a center of a hollow portion of the upper vertical frame part.

This configuration makes collision load, inputted into the load transmission member, easy to transmit to the upper vertical frame part, and the upper vertical frame part easy to deform.

Moreover, it is preferable that: the load transmission member have a substantially L shape in a plan view; and an attachment seat surface, extending in the vehicle width direction, to which to attach another part be formed in a front end portion of the load transmission member.

This configuration makes it possible to receive collision load inputted from the vehicle front widely using the attachment seat surface.

Besides, it is preferable that: the vehicle body front part structure further include a protector which has an L shape in a side view; and the collision detection sensor be fixed to a vehicle-width-direction inner side wall of the upper vertical frame part. It is preferable that the protector be fixed to the vehicle-width-direction inner side wall of the upper vertical frame part at a position upper or lower than the collision detection sensor; and the protector be located closer to the vehicle front than the collision detection sensor.

In the event of a frontal collision, this configuration makes it easy for the broken vehicle body front part to hit the protector earlier than the collision detection sensor, and accordingly makes it possible to inhibit breakage of the collision detection sensor.

It is preferable that the vehicle body front part structure further include a reinforcement member interposed between the lower vertical frame part and the front end portion of the front side frame.

In the event of a small overlap collision, the power unit moves toward the vehicle front to hit the lower lateral frame part, and the lower vertical frame part goes into a condition (a swing mode) in which the lower vertical frame part turns toward the vehicle front around the fixation part between the lower vertical frame part and the front side frame. In the present invention, the reinforcement member is provided to the fixation part. Thus, when the swing mode occurs, stress is concentrated onto the reinforcement member. This makes it possible to inhibit the lower vertical frame part from being broken into small plate pieces.

In addition, it is preferable that a lower end portion of the vertical frame part be inserted into and fixed to the vehicle-width-direction outer end portion of the lateral frame part.

In the case where the lower end portion of the vertical frame part is inserted into and fixed to the vehicle-width-direction outer end portion of the lateral frame part, the connecting force between the lateral frame part and the vertical frame part is stronger than otherwise, and the swing mode can be accordingly inhibited.

Furthermore, it is preferable that the vehicle body front part structure further include a front bumper beam arranged closer to the vehicle front than the load transmission member.

In the event of a frontal collision of the vehicle, this configuration makes the front bumper beam retreat to push the load transmission member toward the vehicle rear, and accordingly enables collision load to be preferably transmitted to the upper vertical frame part fixed to the load transmission member. Thereby, the upper vertical frame part is easily deformed, and the collision of the vehicle can be detected quickly.

Moreover, it is preferable that: a first load receiving surface located outward of the front side frame in the vehicle width direction be provided in a lower end portion of the front bulkhead; and a second load receiving surface bulging outward in the vehicle width direction be provided on an outer surface of the front end portion of the front side frame.

This configuration makes it possible to realize the vehicle body structure capable of coping with a small overlap collision.

Advantageous Effects of Invention

The vehicle body front part structure according to the present invention has both deformability and shape retainability, as well as is capable of: detecting collision of the vehicle quickly; and inhibiting frontward movement of the power unit in the event of a small overlap collision.

DESCRIPTION OF EMBODIMENTS

Hereinafter, a first embodiment of the present invention will be described with reference to the accompanying drawings depending on the necessity. Incidentally, "front-rear," "upper-lower," and "left-right" indicated by arrows in each drawing respectively represent a vehicle front-rear direction, a vehicle upper-lower direction, and a left-right direction (a vehicle width direction) viewed from the driver's seat. Furthermore, in the embodiment, a vertical cross-section means a perpendicular cross-section, and a lateral cross-section means a horizontal cross-section.

To begin with, descriptions will be provided for an overall configuration of a vehicle 10 using a vehicle body front part structure according to the present invention.

Figure 1:
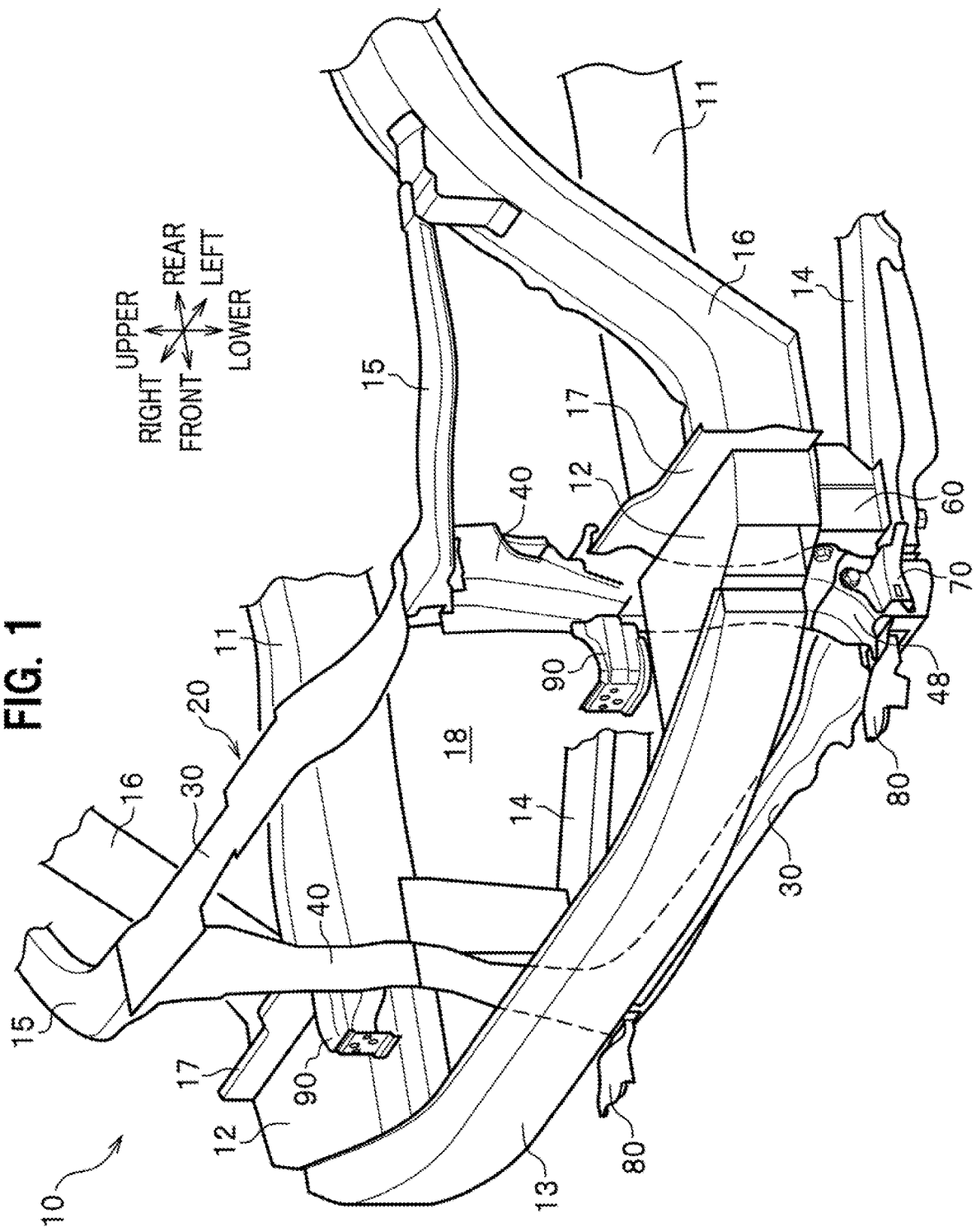
FIG. 1 is a perspective view of a vehicle body front part for a vehicle using a vehicle body front part structure according to a first embodiment of the present invention.

As shown in FIG. 1, the vehicle 10 includes: a pair of left and right front side frames 11, 11 extending in the vehicle front-rear direction; bumper beam extensions 12, 12 respectively provided to front end parts of the left and right front side frames 11, 11 using attachment plates 17, 17. The vehicle 10 includes: a front bumper beam 13 provided between the left and right bumper beam extensions 12, 12; and a front sub frame 14 arranged lower than the front side frames 11, 11.

The vehicle 10 further includes: a front bulkhead 20 arranged inside the left and right bumper beam extensions 12, 12; left and right upper members 15, 15 supporting upper end portions of the front bulkhead 20; left and right lower members 16, 16 each located closer to the vehicle exterior than the corresponding front side frame 11, and each connected to a rear end portion of the corresponding bumper beam extension 12.

A space surrounded by the front side frames 11, the front bulkhead 20 and the like is used as a power loading chamber 18 in which to arrange a power unit 140 (see FIG. 16) such as an engine and a transmission. Gussets 19 (see FIG. 16) extending out toward the outside in a vehicle width direction are arranged on outer side surfaces of the front end parts of the front side frames 11, respectively. The gussets 19 connect front side frames 11 and the bumper beam extensions 12, respectively. In its bottom view, each gusset 19 has a triangular shape, and has a shape which becomes wider toward the outside in the vehicle width direction as it becomes closer to the vehicle's front. The gusset 19 is a second load receiving surface in the scope of claims.

Next, detailed descriptions will be provided for a configuration of the front bulkhead 20.

The front bulkhead 20 is a metal-made member which has a rectangular frame shape in its front view. The front bulkhead 20 includes: a pair of upper and lower lateral frame parts 30, 30 extending in the left-right direction; and a pair of left and right vertical frame parts 40, 40 extending in an upper-lower direction to connect vehicle-width direction outer end portions of the lateral frame parts 30, 30.

Figure 2:
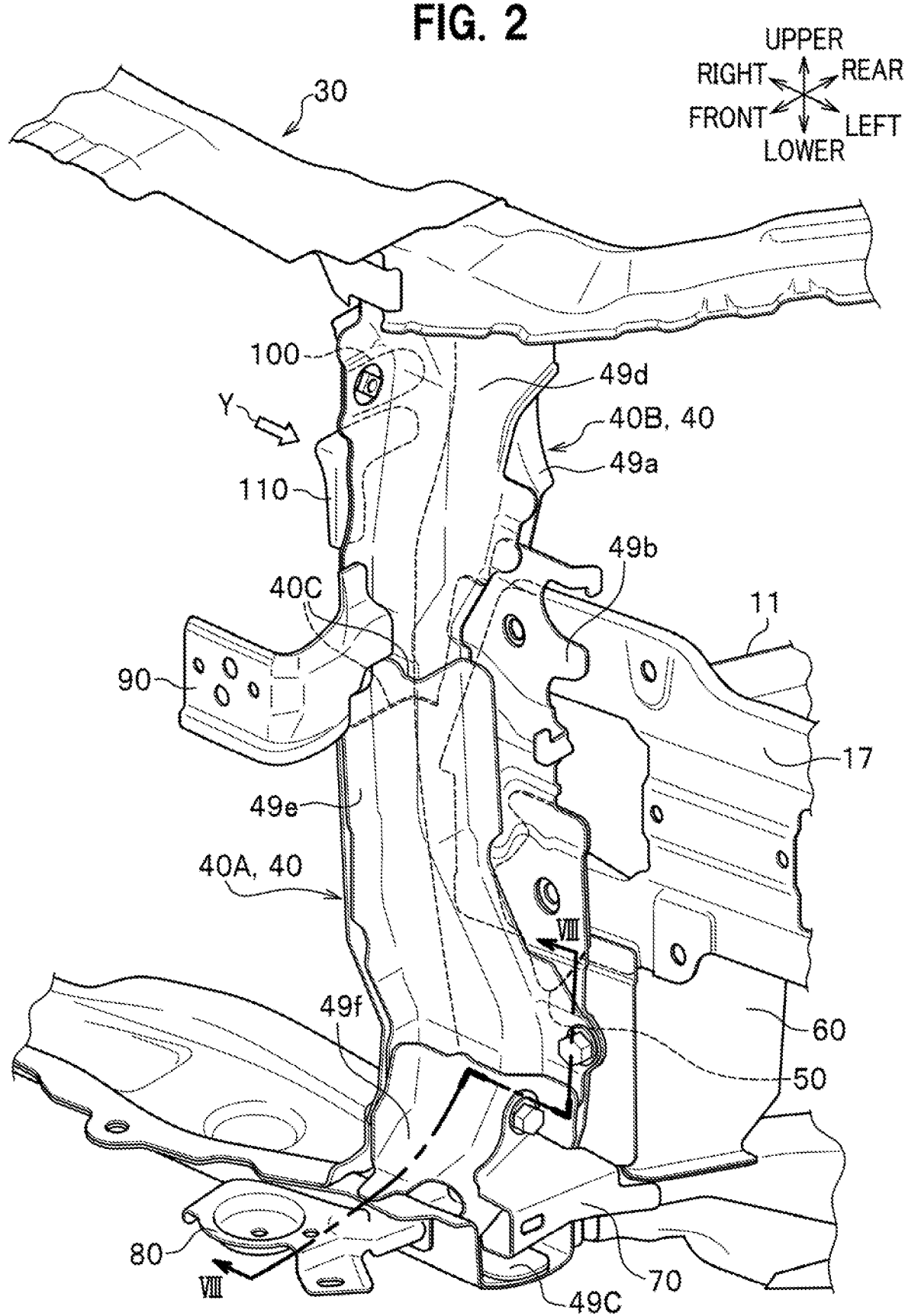
FIG. 2 is a downward perspective view of a left side of a front bulkhead from a left diagonal front.

As shown in FIG. 2, a reinforcement member 50 and a support member 60 are attached to a rear end portion of each vertical frame part 40. A first load transmission member 70 and an intercooler attachment bracket 80 are attached to a lower end portion of the vertical frame part 40. A second load transmission member 90, a collision detection sensor 100 and a protector 110 are attached to an upper half portion of the vertical frame part 40. Detailed descriptions will be provided for each of these members later.

Figure 3:
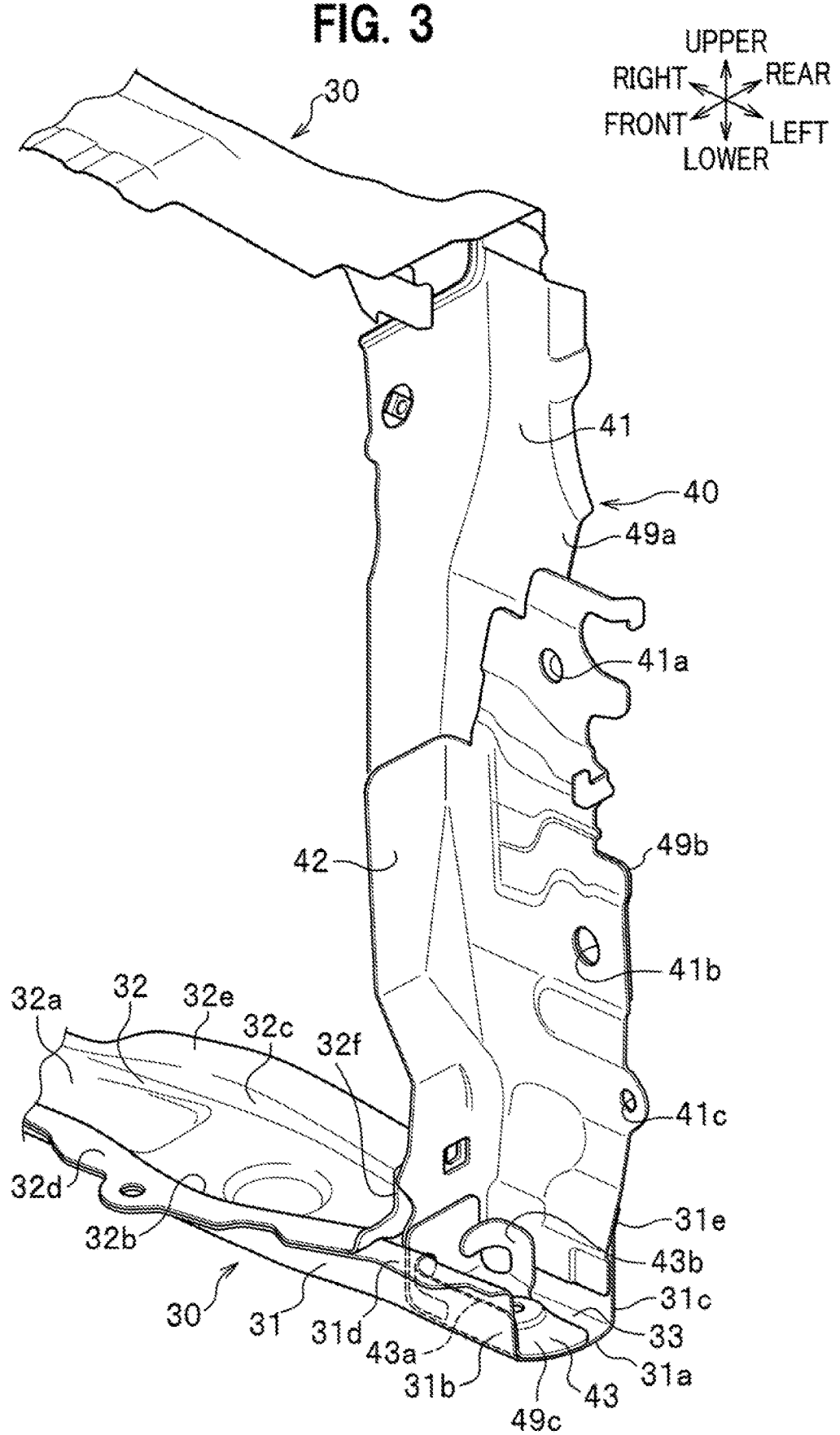
FIG. 3 is a perspective view illustrating a first plate part, a second plate part and a third plate part of a vertical frame part.

As shown in FIG. 3, one lateral frame part 30 is a member formed by welding a lower member 31 and a lid member 32 which are each formed by pressing a metal plate. In its vertical cross-sectional view in the vehicle front-rear direction, the lower member 31 has a hat shape which is open upward. An open cross-sectional part 33 open upward but not closed by the lid member 32 is formed in a vehicle-width direction outer part of the lower member 31.

The lower member 31 includes: a lower wall part 31a extending in the vehicle front-rear direction and in the vehicle width direction; a front wall part 31b extending upward from a front edge of the lower wall part 31a; and a rear wall part 31c extending upward from a rear edge of the lower wall part 31a. The lower member 31 further includes: a flange part 31d extending toward the vehicle front from an upper edge of the front wall part 31b; and a flange part 31e extending toward the vehicle rear from an upper edge of the rear wall part 31c.

The lid member 32 is a member which closes an upper opening of the lower member 31. The lid member 32 has a hat shape which is open upward, and has a shape which is fit to the shape of the lower member 31. Specifically, the lid member 32 includes: an upper wall part 32a extending in the vehicle front-rear direction and in the vehicle width direction; a front wall part 32b extending upward from a front edge of the upper wall part 32a; a rear wall part 32c extending upward from a rear edge of the upper wall part 32a; a flange part 32d extending toward the vehicle front from an upper edge of the front wall part 32b; and a flange part 32e extending toward the vehicle rear from an upper edge of the rear wall part 32c.

The flange part 32d is welded to an upper surface of the flange part 31d. The flange part 32e is welded to an upper surface of the flange part 31e. A joining flange 32f extending upward is formed in a vehicle-width direction outer end portion of the lid member 32. The joining flange 32f is welded to a vehicle interior-side wall 42 of the vertical frame part 40.

Figure 4:
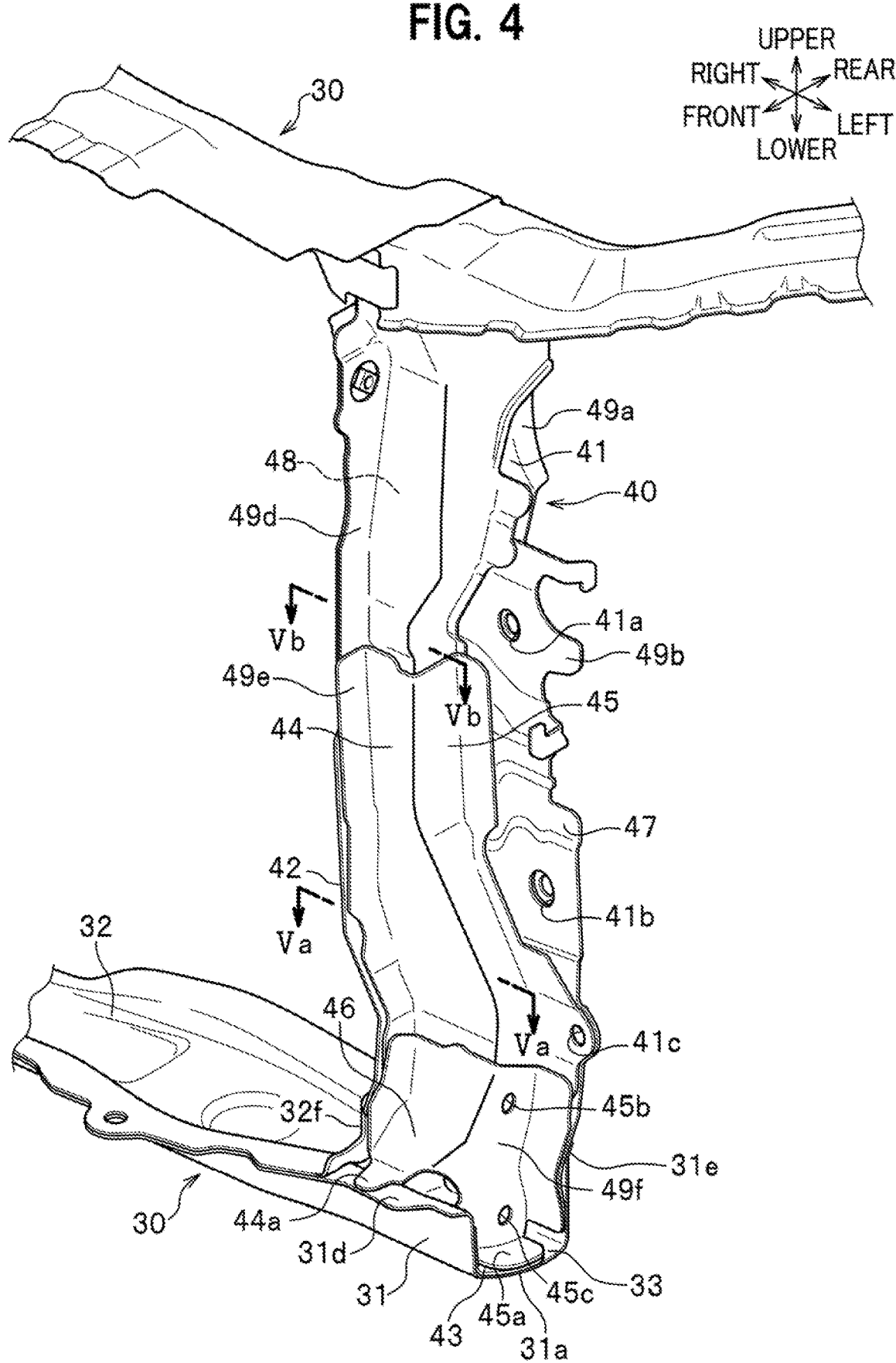
FIG. 4 is a perspective view illustrating how a fourth plate part, a fifth plate part and a six plate part are assembled to the vertical frame part shown in FIG. 3.

As shown in FIGS. 3 and 4, the vertical frame part 40 is a hollow member formed by welding multiple (6 in this embodiment) plate bodies which are each formed by pressing a metal plate, that is to say, first to sixth plate bodies 49a to 49f. In their lateral cross-sectional view, the first to sixth plate bodies 49a to 49f each have a substantially L shape. The first to sixth plate bodies 49a to 49f are assembled by joining their wall parts and edge portions. The vertical frame part 40 includes a rear side wall 41, the vehicle interior-side wall 42, a bottom wall 43, a front side wall 44, a vehicle exterior-side wall 45, a frontward extending part 46, a vehicle body attachment seat 47 and a hollow part 48.

As shown in FIG. 3, the rear side wall 41 is a wall-shaped part including, mainly, the first plate body 49a and the second plate body 49b, and extending in the vehicle width direction and in the upper-lower direction. An upper end portion of the rear side wall 41 extends to a position which is higher than that of the vehicle interior-side wall 42, and is welded to the upper lateral frame part 30. A lower end portion of the rear side wall 41 extends to the inside of the open cross-sectional part 33. The rear side wall 41 includes multiple (3 in this embodiment) though-holes, that is to say, through-holes 41a to 41c. The through-holes 41a to 41c are vertically arranged with a space between each two neighboring holes.

The vehicle interior-side wall 42 is a wall-shaped part including, mainly, the first plate body 49a and the second plate body 49b, and extending in the vehicle front-rear direction and in the upper-lower direction. A lower end portion of vehicle interior-side wall 42 extends to a position where the lower end portion thereof overlaps the joining flange 32f in the vehicle width direction.

The bottom wall 43 is a wall-shaped part including, mainly, the third plate body 49c, and extending in the vehicle front-rear direction and in the vehicle width direction. The bottom wall 43 is arranged inside the open cross-sectional part 33. The bottom wall 43 is welded to an upper surface of a lower wall part 31a. Front and rear flanges 43a, 43b extending upward are formed in front and rear edges of the bottom wall 43, respectively. The front flange 43a is welded to a rear surface of the front wall part 31b. The rear flange 43b is welded to a front surface of the rear wall part 31c with the rear side wall 41 in between.

As shown in FIG. 4, the front side wall 44 is a wall-shaped part including, mainly, the fourth plate body 49d, the fifth plate body 49e and the sixth plate body 49f, and extending in the vehicle width direction and in the upper-lower direction. A front flange 44a extending toward the vehicle front is formed in a lower end portion of the front side wall 44. The front flange 44a is welded to an upper surface of the flange part 31d.

The vehicle exterior-side wall 45 is a wall-shaped part including, mainly, the fourth plate body 49d, the fifth plate body 49e and the sixth plate body 49f, and extending in the vehicle front-rear direction and in the upper-lower direction. A lower end portion of the vehicle exterior-side wall 45 extends to the inside of the open cross-sectional part 33. An outer flange 45a extending toward the outside in the vehicle width direction is formed in the lower end portion of the vehicle exterior-side wall 45. The outer flange 45a is welded to an upper surface of the lower wall part 31a with a bottom wall 43 interposed in between. Multiple (2 in this embodiment) through-holes 45b, 45c are formed in the lower end portion of the vehicle exterior-side wall 45. The through-holes 45b, 45c are arranged in the upper-lower direction with a space in between.

The frontward extending part 46 is a part provided to the lower end portion of the vertical frame part 40, and curving (bending) extending toward the vehicle front. The frontward extending part 46 is formed by bending (curving) the entireties of the lower end portions of the front side wall 44, the vehicle exterior-side wall 45 and the rear side wall 41 toward the vehicle front as they becomes lower from above. The frontward extending part 46 extends furthest forward in the vertical frame part 40.

The vehicle body attachment seat 47 is a part provided to a vehicle outer-side portion of the rear side wall 41, and to which to attach the front side frame 11. Two of the through-holes 41a to 41c formed in the rear side wall 41, that is to say, the through-holes 41a, 41b, are arranged in the vehicle body attachment seat 47.

Detailed descriptions will be provided for the vehicle body attachment seat 47. A central portion of the rear side wall 41 in the upper-lower direction (which overlaps the attachment plate 17 in the front-rear direction) extends in the upper-lower direction while having a substantially constant width. Central portions of the front side wall 44 and the vehicle exterior-side wall 45 in the upper-lower direction (which overlap the attachment plate 17 in the front-rear direction) incline located closer to the vehicle-width-direction inside toward their top ends from their bottom ends, and thereafter substantially linearly extending upward. Thereby, the vehicle body attachment seat 47 exposed extending further toward the vehicle outside than the vehicle exterior-side wall 45 (the hollow part 48) is formed in the vehicle outer-side part of the rear side wall 41. Furthermore, a central portion of the hollow part 48 in the upper-lower direction is arranged offset to the vehicle-width-direction inside at a position where the central portion thereof overlaps the attachment plate 17 in the front-rear direction.

Here, referring to FIGS. 2 and 5, more detailed descriptions will be provided for the vertical frame part 40.

As shown in FIG. 2, based on difference in rigidity against collision load, the vertical frame part 40 is divided into a lower vertical frame part 40A arranged in the lower side of the vertical frame part; and an upper vertical frame part 40B arranged on the lower vertical frame part 40A. In other words, the vertical frame part 40 is formed by connecting the lower vertical frame part 40A whose rigidity against the collision load is higher because the lower vertical frame part is supported from the vehicle rear by the front side frame 11, and the upper vertical frame part 40B whose rigidity against the collision load is lower because the lower vertical frame part is not supported from the vehicle rear by the front side frame 11.

The lower vertical frame part 40A includes: the second plate body 49b fixed directly to the front side frame 11; the fifth plate body 49e arranged in substantially the same position the upper-lower direction as the second plate body 49b; and the third and sixth plate bodies 49c, 49f arranged in a lower position than the second plate body 49b. The upper vertical frame part 40B includes the first and fourth plate bodies 49a, 49d arranged in an upper position than the second plate body 49b. A boundary part 40C between the lower vertical frame part 40A and the upper vertical frame part 40B functions as a folded part (vulnerable part) in the event of the collision of the vehicle 10.

Figure 5A:
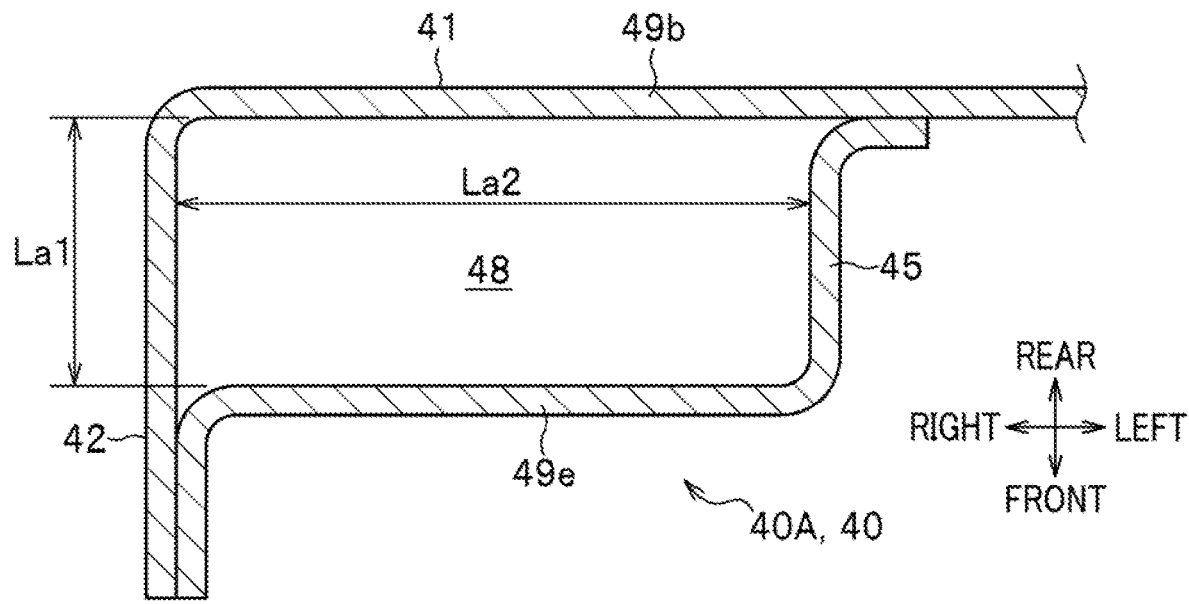
FIG. 5A is a cross-sectional view taken along the Va-Va line of FIG. 4.
Figure 5B:
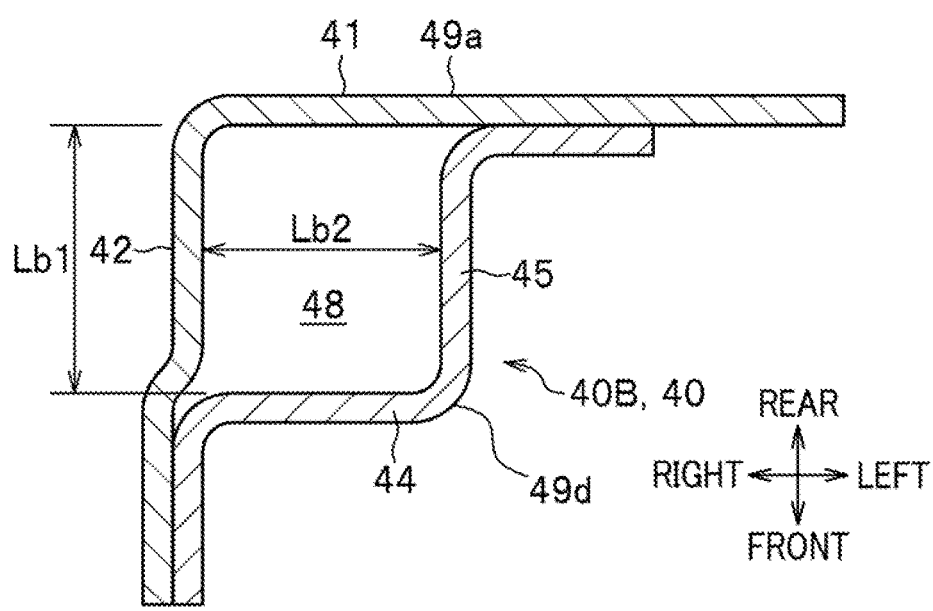
FIG. 5B is a cross-sectional vies taken along the Vb-Vb line of FIG. 4.

As shown in FIGS. 5A and 5B, the vertical frame part 40 includes the hollow part 48 continuing in the upper-lower direction. The hollow part 48 is formed in the shape of a square cylinder. The hollow part 48 on the side of the lower vertical frame part 40A, which is shown in FIG. 5A, is formed by being surrounded by the second and fifth plate bodies 49b, 49e. A vehicle front-rear direction dimension La1 of the hollow part on the side of the lower vertical frame part 40A is substantially constant in the vehicle width direction. A vehicle width direction dimension La2 of the hollow part 48 on the side of the lower vertical frame part 40A is substantially constant in the vehicle front-rear direction.

The hollow part 48 on the side of the upper vertical frame part 40B, which is shown in FIG. 5B, is formed by being surrounded by the first and fourth plate bodies 49a, 49d. A vehicle front-rear direction dimension Lb1 of the hollow part 48 on the side of the upper vertical frame part 40B is substantially constant in the vehicle width direction. A vehicle width direction dimension Lb2 of the hollow part 48 on the side of the upper vertical frame part 40B is substantially constant in the vehicle front-rear direction.

The vehicle front-rear direction dimension Lb1 of the hollow part 48 on the side of the upper vertical frame part 40B is formed equal or substantially equal to the vehicle front-rear direction dimension La1 of the hollow part 48 on the side of the lower vertical frame part 40A. The vehicle width direction dimension Lb2 of the hollow part 48 on the side of the upper vertical frame part 40B is formed smaller than the vehicle width direction dimension La2 of the hollow part 48 on the side of the lower vertical frame part 40A. Thus, a hollow cross-sectional area of the upper vertical frame part 40B which is orthogonal to an extension direction of the upper vertical frame part 40B is formed smaller than a hollow cross-sectional area of the lower vertical frame part 40A which is orthogonal to an extension direction of the lower vertical frame part 40A. Incidentally, the hollow cross-sectional area of the upper vertical frame part 40B may be reduced by adjusting at least one of the vehicle front-rear direction dimensions La1, Lb1 and the vehicle width direction dimensions La2, Lb2.

Figure 6:
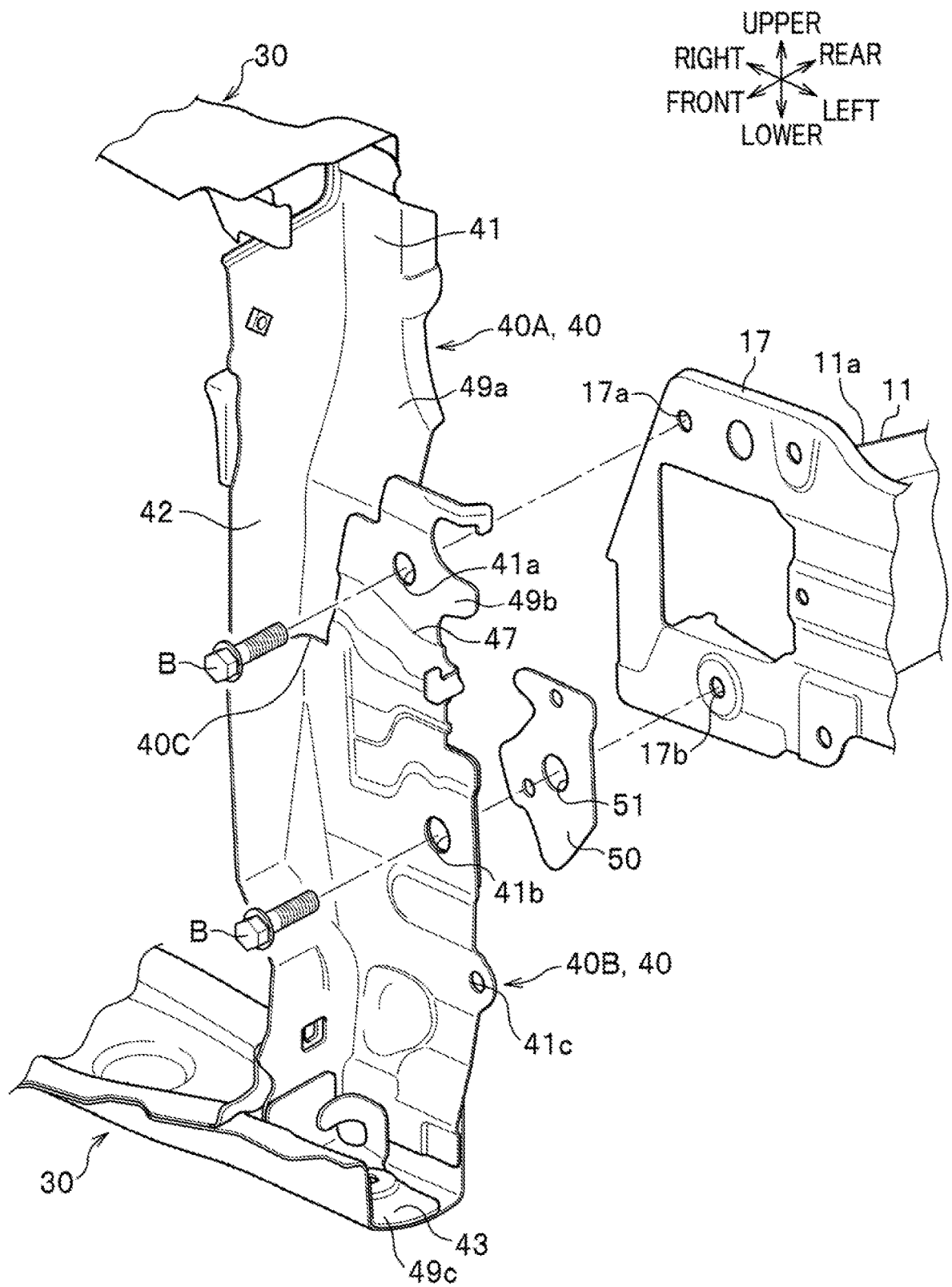
FIG. 6 is an exploded perspective view illustrating the vertical frame part, an attachment plate and a reinforcement member.

Next, referring to FIG. 6, detailed descriptions will be provided for the attachment plate 17 and the reinforcement member 50.

The attachment plate 17 is a plate-shaped member provided to a front end part 11a of the front side frame 11. The attachment plate 17 is formed in a predetermined complicated shape by providing bent shapes and notch shapes to a metal plate. Through-holes 17a, 17b communicating with the through-holes 41a, 41b of the vehicle body attachment seat 47 is formed in the attachment plate 17.

The reinforcement member 50 is a plate-shaped member interposed between the attachment plate 17 and the vehicle body attachment seat 47. The reinforcement member 50 is formed in a predetermined complicated shape by providing bent shapes and notch shapes to a metal plate. The reinforcement member 50 is arranged overlapping peripheries (peripheral edges) of the through-hole 41b of the vehicle body attachment seat 47 and the through-hole 17b of the attachment plate 17. The reinforcement member 50 has a function of reinforcing the peripheries of the through-hole 41b, 17b.

A through-hole 51 communicating with the through-holes 41b, 17b is formed in the reinforcement member 50. A bolt B for connecting the vehicle body attachment seat 47, the reinforcement member 50 and the attachment plate 17 is inserted through the through-holes 41b, 51, 17b. The fixation portions of the vehicle body attachment seat, the reinforcement member and the attachment plate are arranged in a lower position than the boundary part 40C, and in a higher position than the frontward extending part 46. The fixation portions thereof are arranged near an upper-lower direction intermediate portion of the lower vertical frame part 40A.

Figure 7:
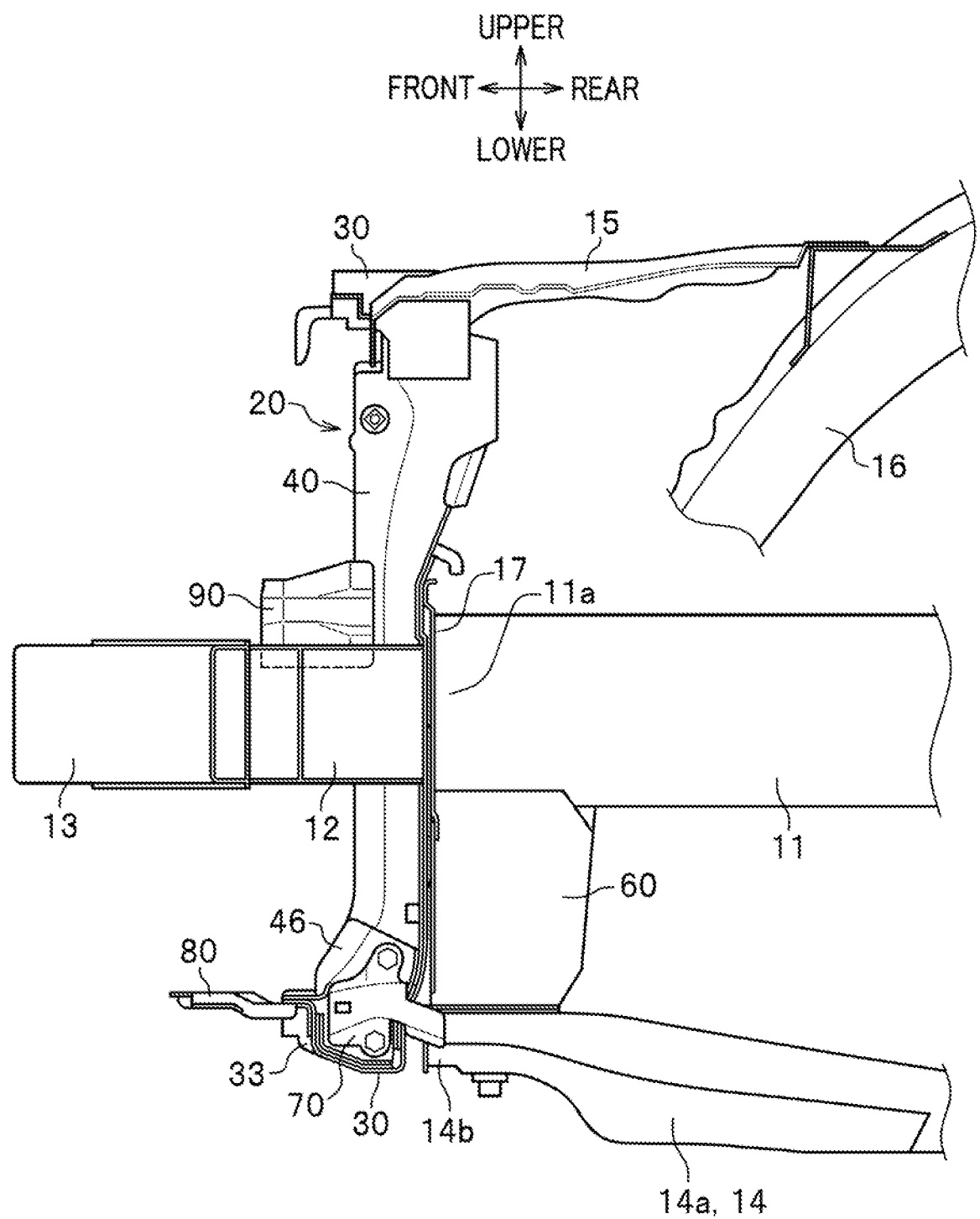
FIG. 7 is a left side view of the vehicle body front part.
Figure 8:
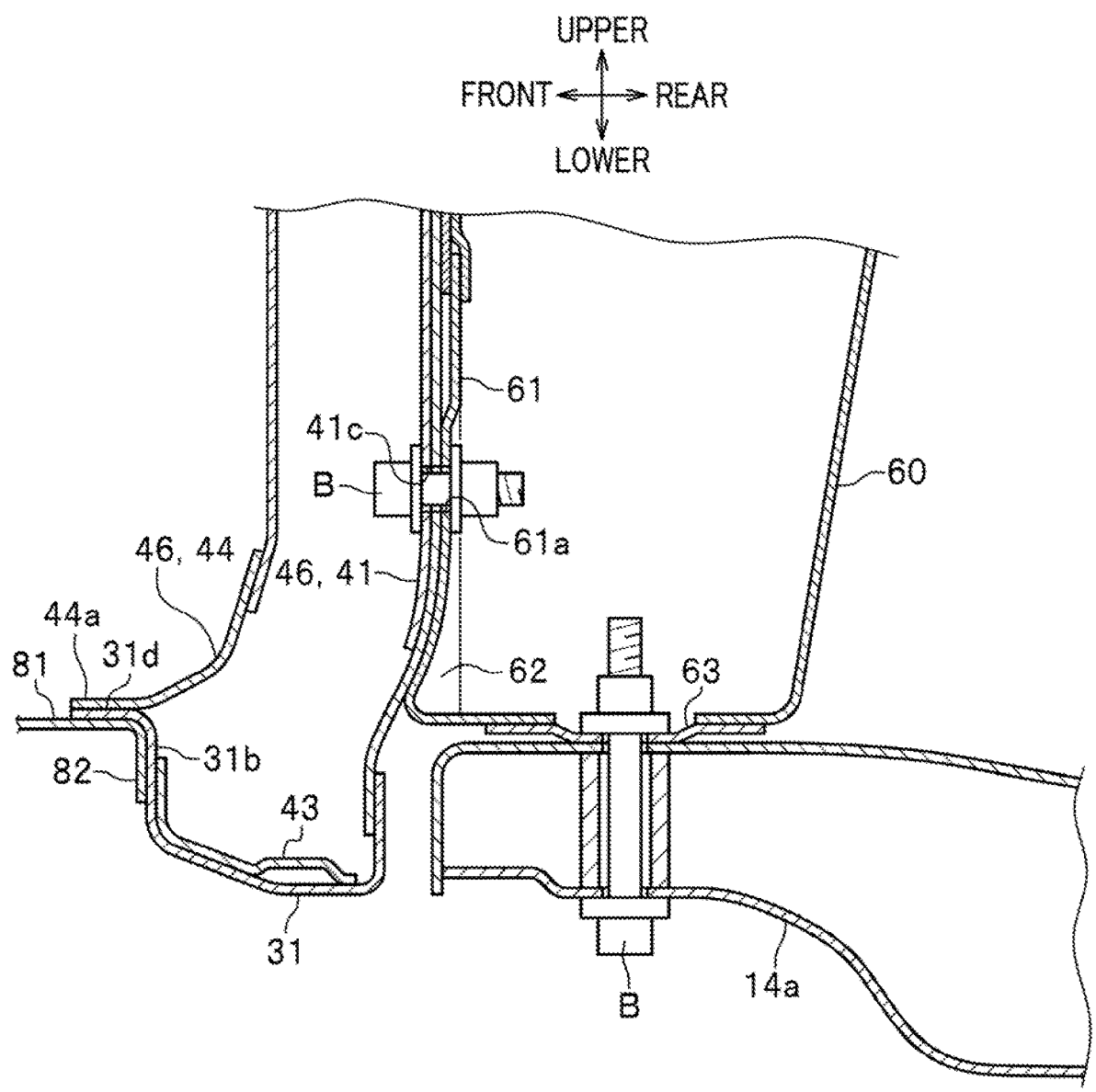
FIG. 8 is a cross-sectional view taken along the VIII-VIII line of FIG. 2.

Next, referring to FIGS. 7 and 8, detailed descriptions will be provided for the front sub frame 14 and the support member 60.

As shown in FIG. 7, the front sub frame 14 includes a pair of left and right front-rear frames 14a extending in the vehicle front-rear direction (although FIG. 7 shows only one of the front-rear frames). The front-rear frames 14a is arranged closer to the vehicle rear than the frontward extending part 46 and the open cross-sectional part 33. The front-rear frames 14a is arranged below, and away from, the front side frame 11.

The support member 60 is a hollow member interposed between the front-rear frames 14a and the front side frame 11. The support member 60 plays a role of supporting a front end part 14b of the front-rear frames 14a against the lower surface of the front end part 11a of the front side frame 11. Although its illustration is omitted, the support member 60 is formed by welding multiple plate bodies each of which is formed by pressing a metal plate. The support member 60 is arranged closer to the vehicle rear than the vertical frame part 40.

As shown in FIG. 8, a bulging part 62 bulging toward the vehicle front is formed in a front wall 61 of the support member 60 which faces the vertical frame part 40. The bulging part 62 is formed in a taper shape corresponding to a shape of a rear surface (the rear side wall 41) of the frontward extending part 46. In other words, an amount of bulge of the bulging part 62 becomes gradually larger downward from above. The bulging part 62 is in contact with the rear surface of the frontward extending part 46.

A through-hole 61a communicating with the through-hole 41c of the rear side wall 41 is formed in the front wall 61 of the support member 60. A bolt B for connecting the support member 60 and the rear side wall 41 is inserted through the through-holes 61a, 41c. A bottom wall 63 of the support member 60 is connected to the front-rear frame 14a by the bolt B.

Figure 9:
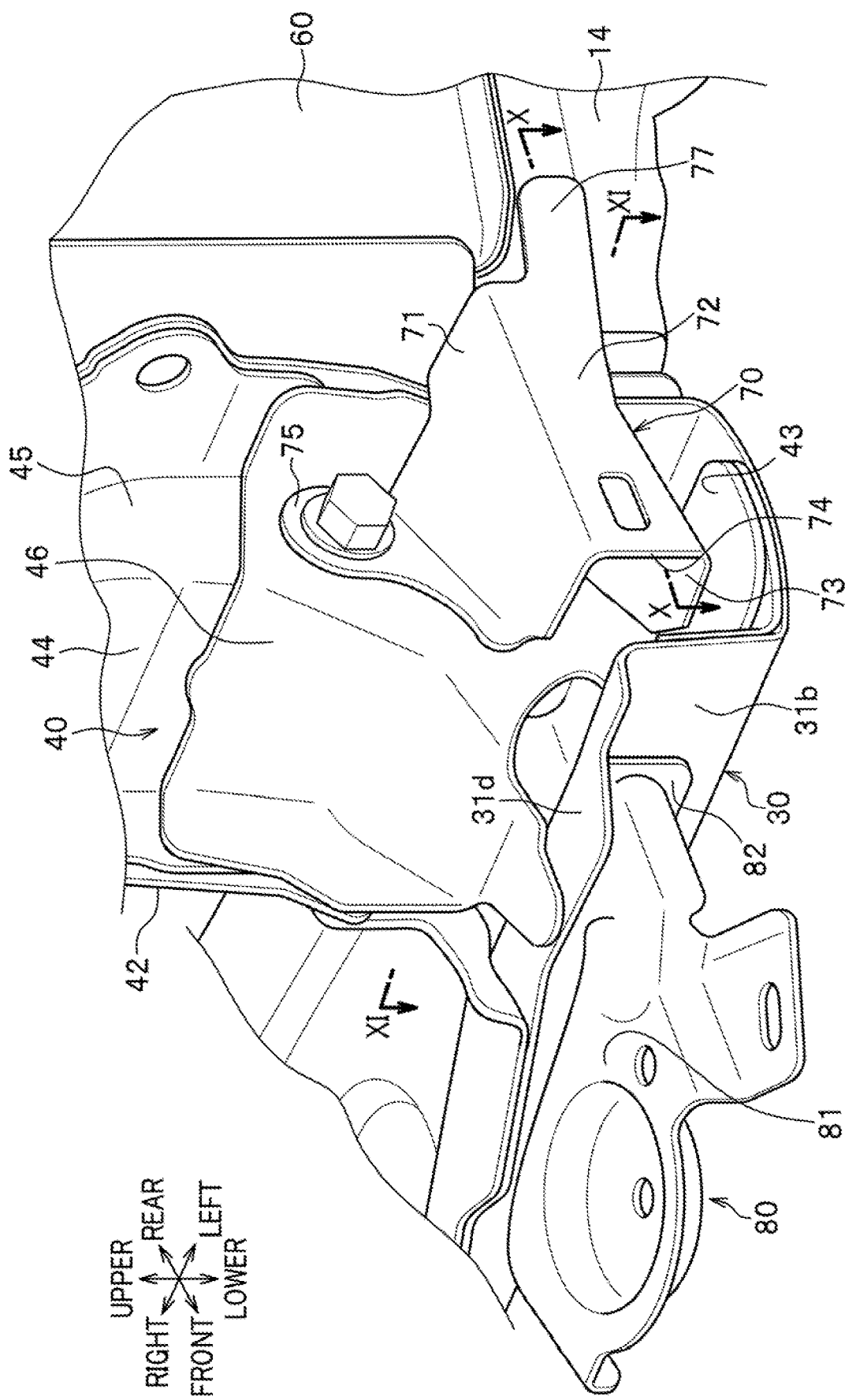
FIG. 9 is a magnified perspective view illustrating a first load transmission member and an intercooler attachment bracket.
Figure 10:
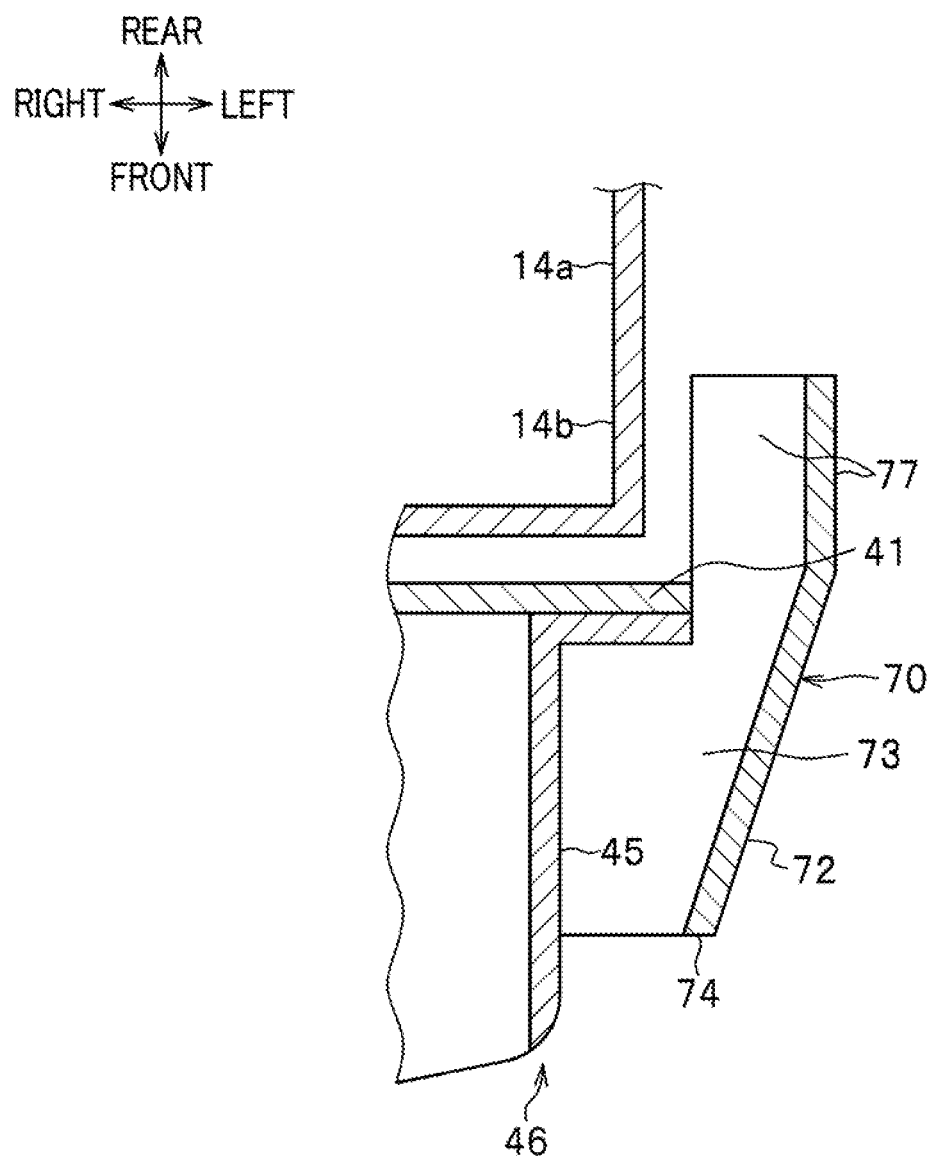
FIG. 10 is a cross-sectional view taken along the X-X line of FIG. 9.
Figure 11:
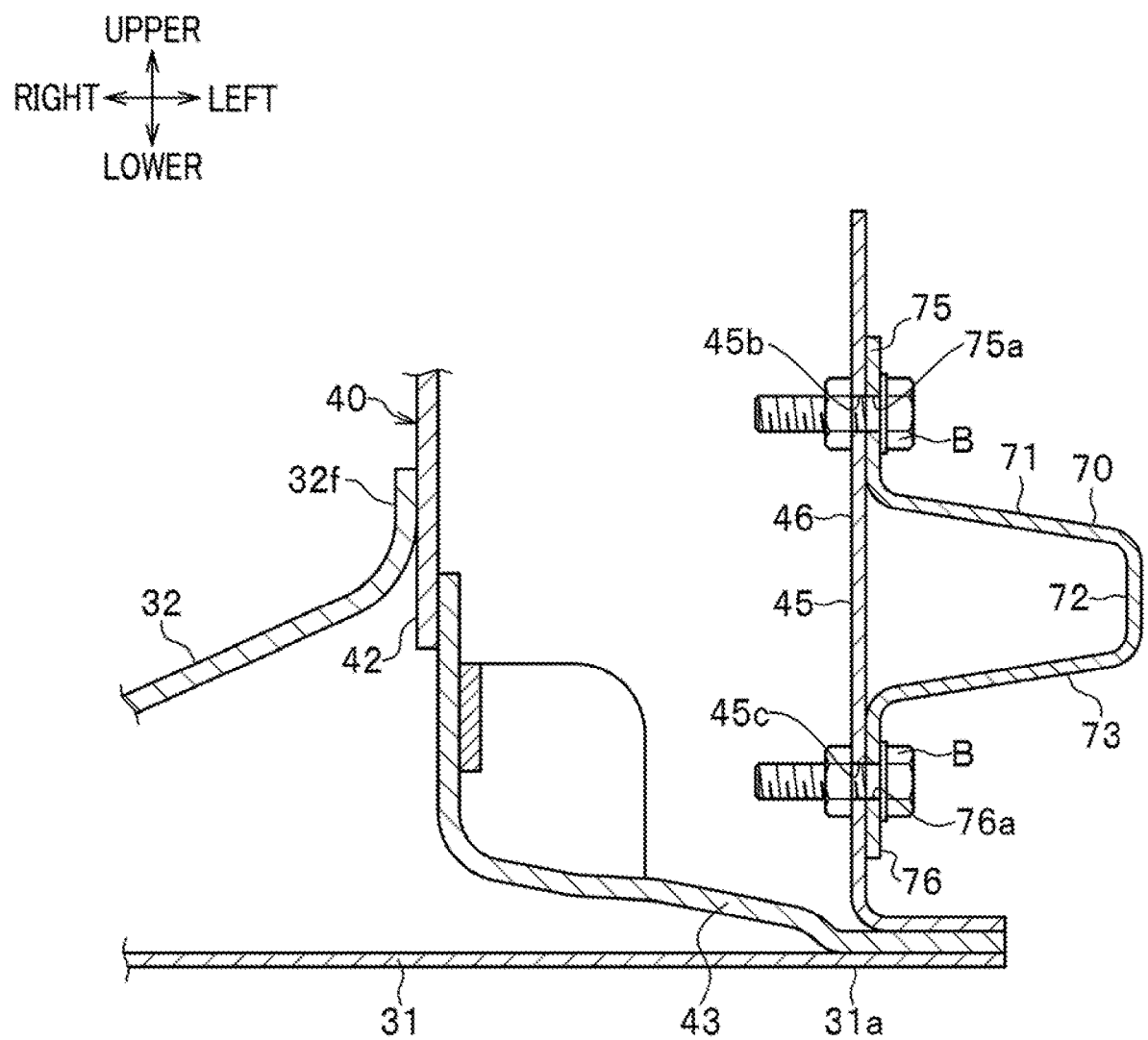
FIG. 11 is a cross-sectional view taken along the XI-XI line of FIG. 9.

Next, referring to FIGS. 9 to 11, detailed descriptions will be provided for the first load transmission member 70 and the intercooler attachment bracket 80.

As shown in FIG. 9, the first load transmission member 70 is a member located outward of the front side frame 11 (see FIG. 2 and the like) in the vehicle width direction, and configured to transmit collision load, inputted in the event of a small overlap collision, to the front side frame 11 via the vertical frame part 40. The first load transmission member 70 is formed in a predetermined complicated shape by providing bent shapes and notch shapes to a metal plate. The first load transmission member 70 is fixed to an outer surface (the vehicle exterior-side wall 45) of the frontward extending part 46. The first load transmission member 70 is a first load receiving surface in the scope of claims.

The first load transmission member 70 includes: an upper surface 71 extending in the vehicle front-rear direction and in the vehicle with direction; an inclined surface 72 extending downward from a vehicle outer edge of the upper surface 71; a lower surface 73 extending inward in the vehicle width direction from a lower edge of the inclined surface 72; and a front end part 74 formed of front edges of the upper surface 71, the inclined surface 72 and the lower surface 73, and having a U shape. The first load transmission member 70 further includes: an upper flange 75 extending upward from a vehicle inner edge of the upper surface 71; a lower flange 76 (see FIG. 11) extending downward from a vehicle inner edge of the lower surface 73; and an engagement part 77 extending toward the vehicle rear from rear edges of the inclined surface 72 and the lower surface 73. Incidentally, the shape of the front end part 74 is not specifically limited. The front end part 74 may be formed, for example, in the shape of a rectangular surface which covers the front edge opening formed by the upper surface 71, the inclined surface 72 and the lower surface 73.

As shown in FIG. 10, the inclined surface 72 continues to an outside of the front end part 74 in the vehicle width direction, and is inclined outward in the vehicle width direction from the vehicle front toward the vehicle rear. The front end part 74 and the inclined surface 72 serve as a contact surface (load receiving surface) for receiving collision load in the event of a small overlap collision. The engagement part 77 is formed extending over rear edges of the inclined surface 72 and the lower surface 73. In its vertical cross-sectional view in the vehicle width direction, the engagement part 77 has an L shape. The engagement part 77 is located outward of the front end part 14b of the front-rear frame 14a in the vehicle width direction.

As shown in FIG. 11, a through-hole 75a communicating with the through-hole 45b of the vehicle exterior-side wall 45 is formed in the upper flange 75. A through-hole 76a communicating with the through-hole 45c of the vehicle exterior-side wall 45 is formed in the lower flange 76. The upper flange 75 and the lower flange 76 are fixed to the vehicle exterior-side wall 45 using the respective bolts B, B.

As shown in FIG. 9, the intercooler attachment bracket 80 is a member for attaching an intercooler (not shown), and is fixed to a vehicle-width direction outer end portion of the lateral frame part 30. The intercooler attachment bracket 80 is formed in a predetermined complicated shape by providing bent shapes as well as concave and convex shapes to a metal plate. The intercooler attachment bracket 80 includes: a placement surface 81 on which to place the intercooler, extending in the vehicle front-rear direction and in the vehicle width direction; and a rear flange 82 extending downward from a rear edge of the placement surface 81.

A rear part of the placement surface 81 is welded to a lower surface of the flange part 31d (see FIG. 8 together). The rear flange 82 is welded to a front surface of the front wall part 31b. In other words, the intercooler attachment bracket 80 is fixed to both the flange part 31d and the front wall part 31b adjacent to the flange part 31d.

Figure 12:
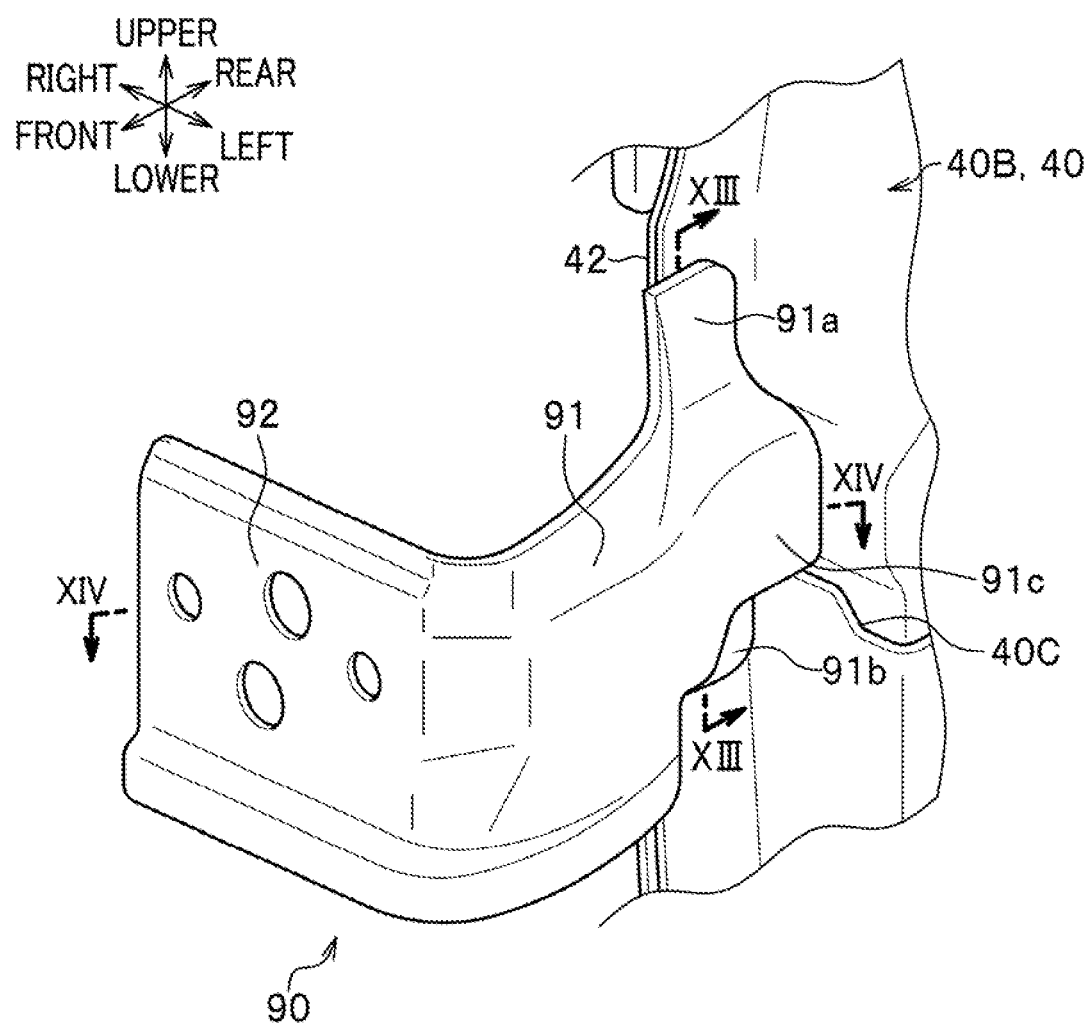
FIG. 12 is a magnified perspective view of a second load transmission member.
Figure 13:
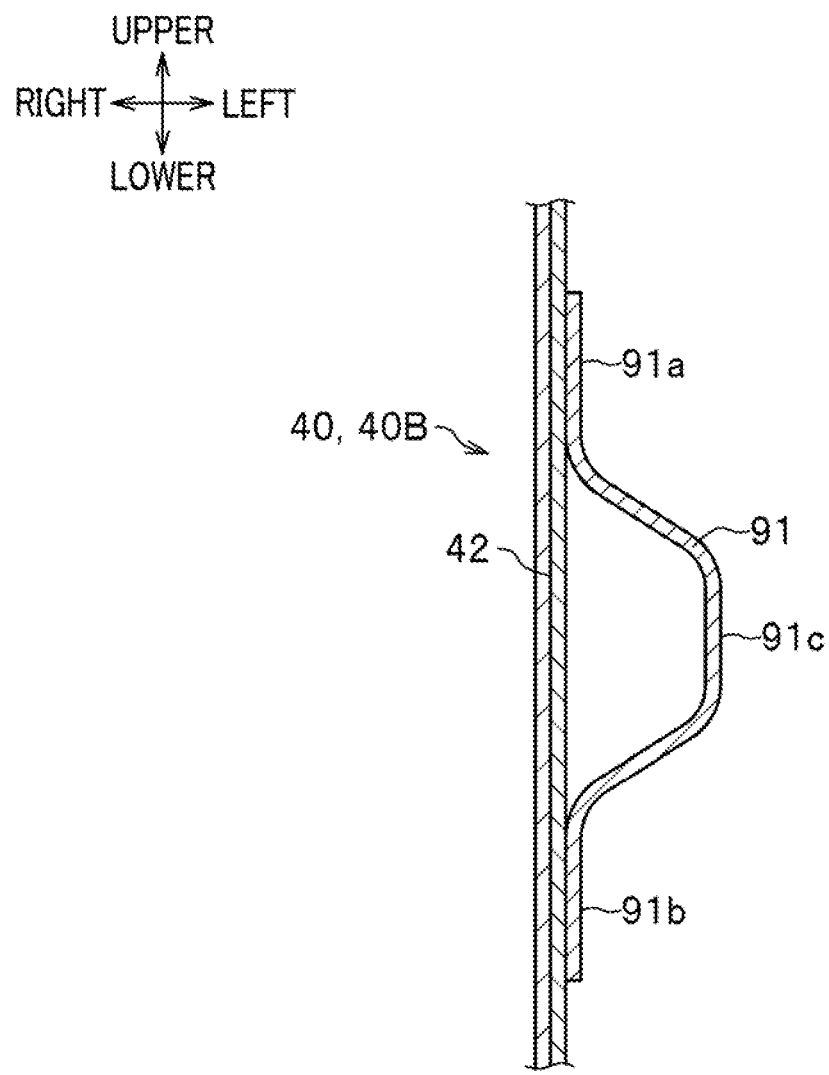
FIG. 13 is a cross-sectional view taken along the XIII-XIII line of FIG. 12.
Figure 14:
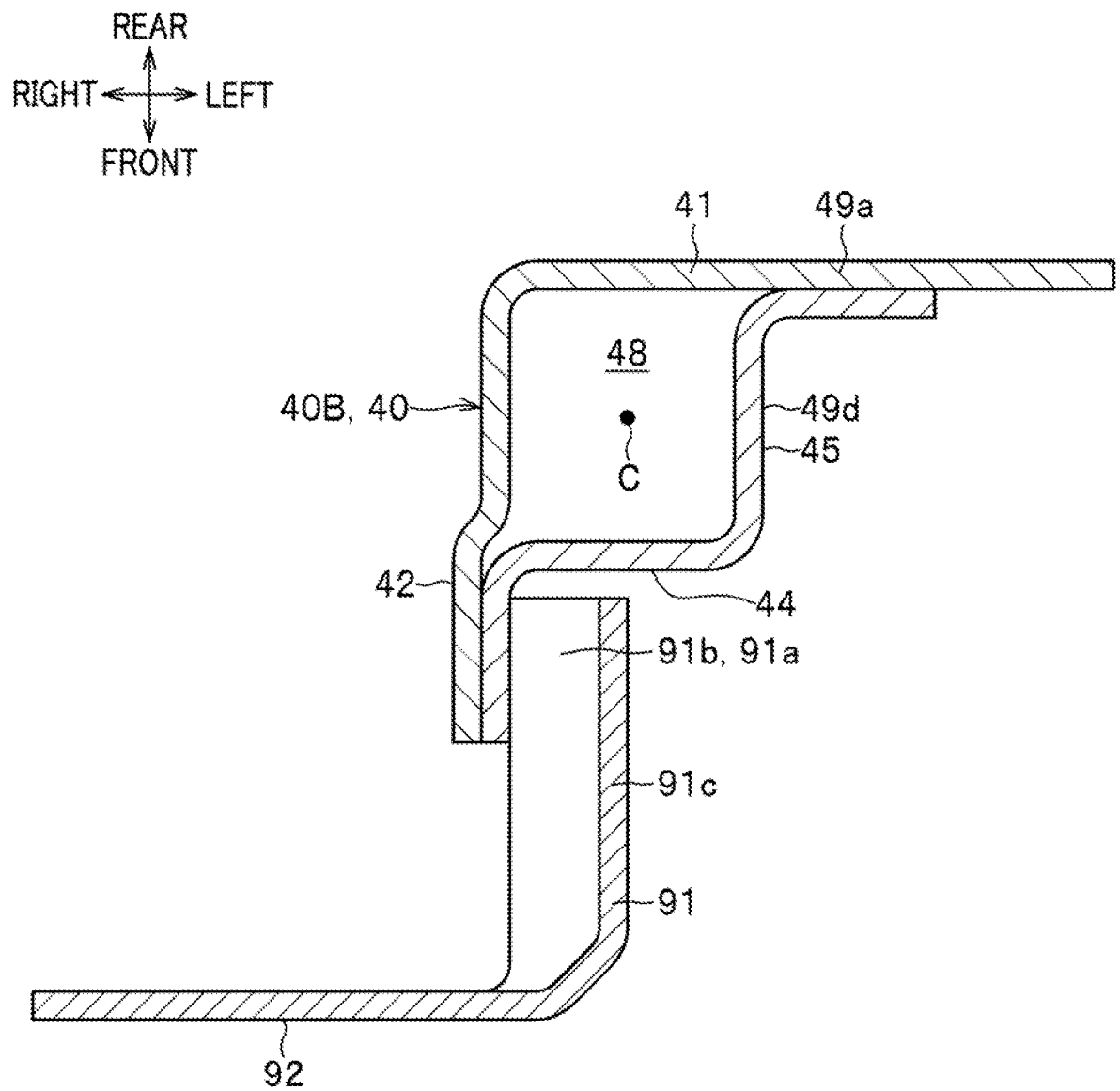
FIG. 14 is a cross-sectional view taken along the XIV-XIV line of FIG. 12.

Next, referring to FIGS. 12 to 14, detailed descriptions will be provided for the second load transmission member 90.

As shown in FIG. 12, the second load transmission member 90 is a member for transmitting collision load, inputted in the event of the collision of the vehicle 10, to the upper vertical frame part 40B. The second load transmission member 90 is formed in a predetermined complicated shape by providing bent shapes and notch shapes to a metal plate. The second load transmission member 90 is set on a lower end portion of the upper vertical frame part 40B (near the boundary part 40C). The second load transmission member 90 projects toward the vehicle front from the upper vertical frame part 40B. The second load transmission member 90 is arranged closer to the vehicle rear than the front bumper beam 13 (see FIG. 7). In other words, the second load transmission member 90 is arranged at a position where, in the event of a collision, the front bumper beam 13 retreats to push the second load transmission member toward the vehicle rear.

The second load transmission member 90 includes: a hat cross-sectional part 91 extending in the vehicle front-rear direction and in the upper-lower direction; and an attachment seat surface 92 extending inward in the vehicle width direction from a front edge of the hat cross-sectional part 91. In its plan view, the second load transmission member 90 has a substantially L shape.

As shown in FIG. 13, in its vertical cross-sectional view in the vehicle width direction, the hat cross-sectional part 91 has a hat shape. The hat cross-sectional part 91 includes: a pair of upper and lower brim parts 91a, 91b fixed to the upper vertical frame part 40B; and a crown part 91c arranged between the upper and lower brim parts 91a, 91b, and located away from the upper vertical frame part 40B toward the vehicle outside. The crown part 91c has a groove shape which is open toward the vehicle inside.

As shown in FIG. 14, the hat cross-sectional part 91 is arranged with the crown part 91c facing a center C of the hollow part 48. The crown part 91c is arranged in a position where the crown part 91c and an imaginary plane passing through the center C and extending in the vehicle front-rear direction overlap each other in the vehicle front-rear direction. The upper and lower brim parts 91a, 91b are welded to the vehicle interior-side wall 42.

The attachment seat surface 92 is a member for attaching a radiator (not shown). The attachment seat surface 92 is formed extending in the vehicle width direction and vertically in the upper-lower direction. The attachment seat surface 92 crosses (in this embodiment, is orthogonal to) the hat cross-sectional part 91.

Figure 15:
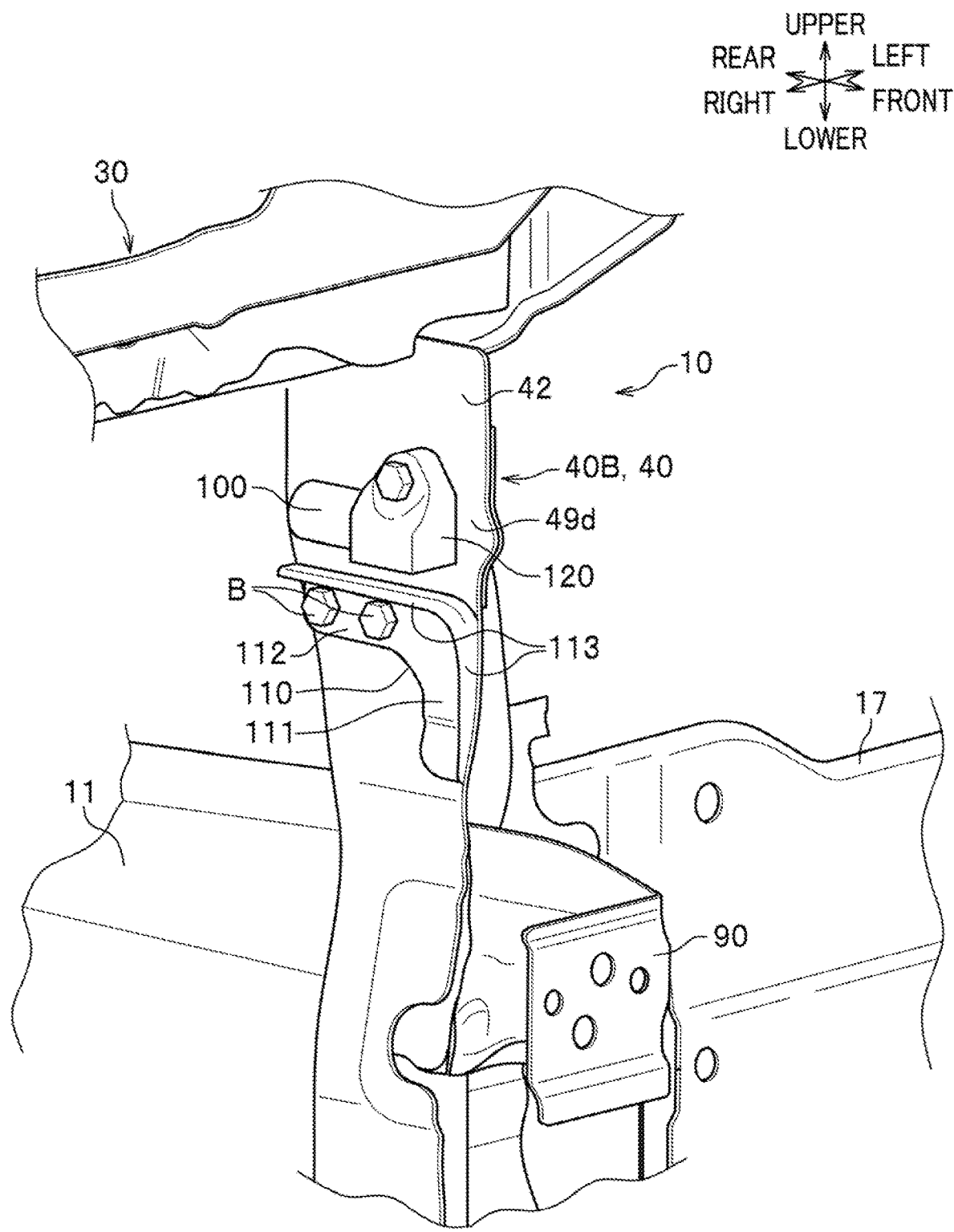
FIG. 15 is a perspective view in an arrow Y direction of FIG. 2.

Next, referring to FIG. 15, detailed descriptions will be provided for the collision detection sensor 100 and the protector 110.

As shown in FIG. 15, the collision detection sensor 100 is formed from an acceleration sensor for detecting collision of the vehicle 10 by moving toward the vehicle rear to detect acceleration. An airbag (not shown) inside the vehicle compartment is configured to be deployed based on the acceleration detected by the collision detection sensor 100.

The collision detection sensor 100 is fixed to the vehicle interior-side wall 42 on the side of the upper vertical frame part 40B with the assistance with a bracket 120. The collision detection sensor 100 is arranged higher than the second load transmission member 90.

The protector 110 is fixed to the vehicle interior-side wall 42 on the side of the upper vertical frame part 40B at a position under and near the collision detection sensor 100. The protector 110 is formed in a predetermined complicated shape by providing bent shapes to a metal plate. In its side view, the protector 110 has an L shape. The protector 110 is located closer to the vehicle front than the collision detection sensor 100. The protector 110 has a configuration in which, in the event of a collision, the protector is capable of coming into contact with a damaged vehicle front portion earlier than the collision detection sensor 100.

The protector 110 includes: a protector vertical wall 111 extending in the vehicle front-rear direction and in the upper-lower direction; and a protector transverse wall 112 extending toward the vehicle rear from an upper edge of the protector vertical wall 111, and extending in the front-rear direction and in the upper-lower direction. The protector transverse wall 112 is connected to the vehicle interior-side wall 42 on the side of the upper vertical frame part 40B using multiple (in this embodiment, two) bolts B, B which are arranged in a line in the front-rear direction. A folded part 113 for increasing rigidity is folded and formed on a front edge of the protector vertical wall 111 and an upper edge of the protector transverse wall 112. The folded part 113 extends in a direction orthogonal to the front edge of the protector vertical wall 111 and the protector transverse wall 112 (inward in the vehicle width direction). Incidentally, the protector 110 may be set in a position higher than and near the collision detection sensor 100.

The vehicle 10 using the vehicle body front part structure according to this embodiment is configured basically as discussed above. Next, descriptions will be provided for working and effects of the vehicle 10.

Figure 16:
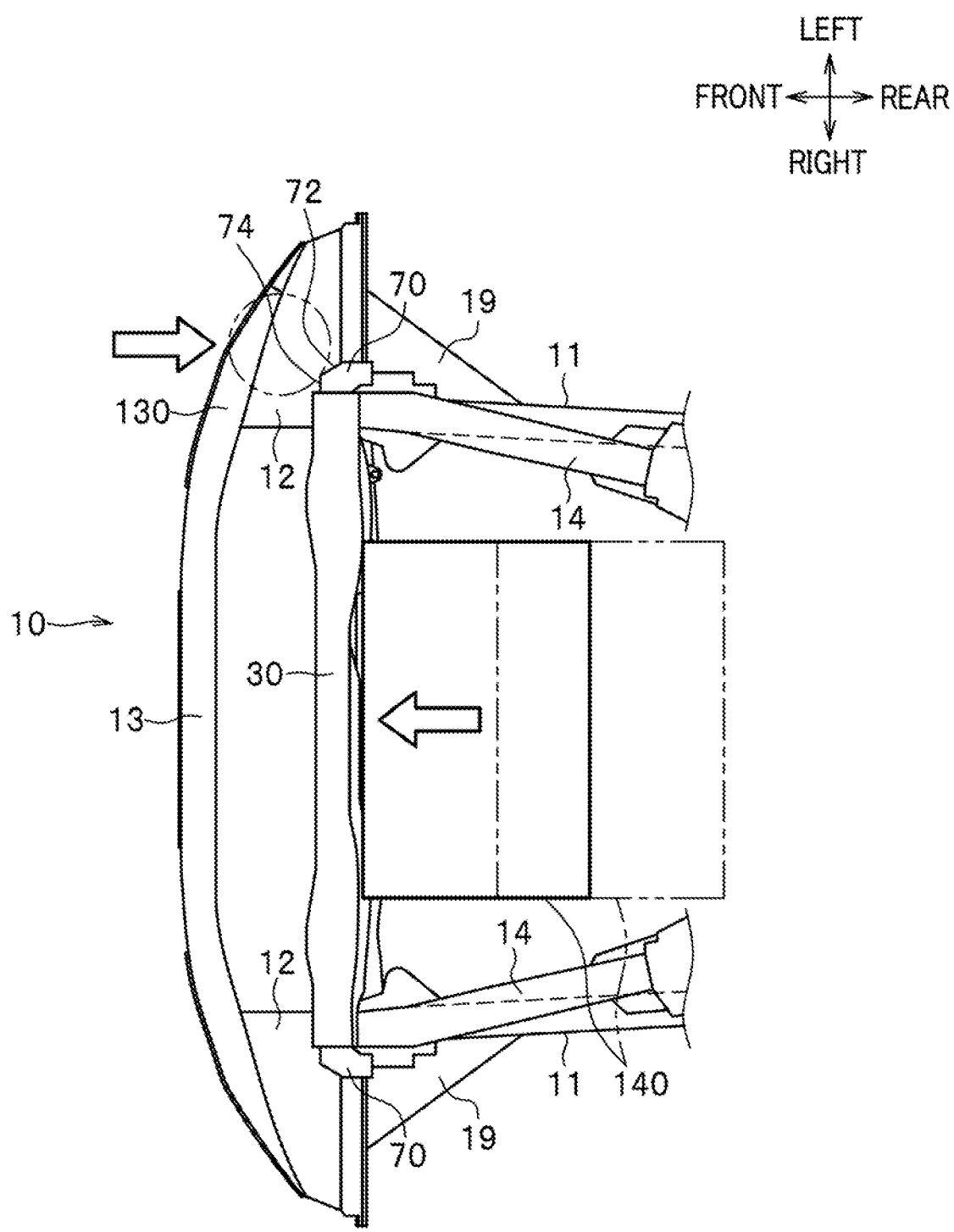
FIG. 16 is a bottom view showing a condition which happens in the event of a small overlap collision against a utility pole.
Figure 17:
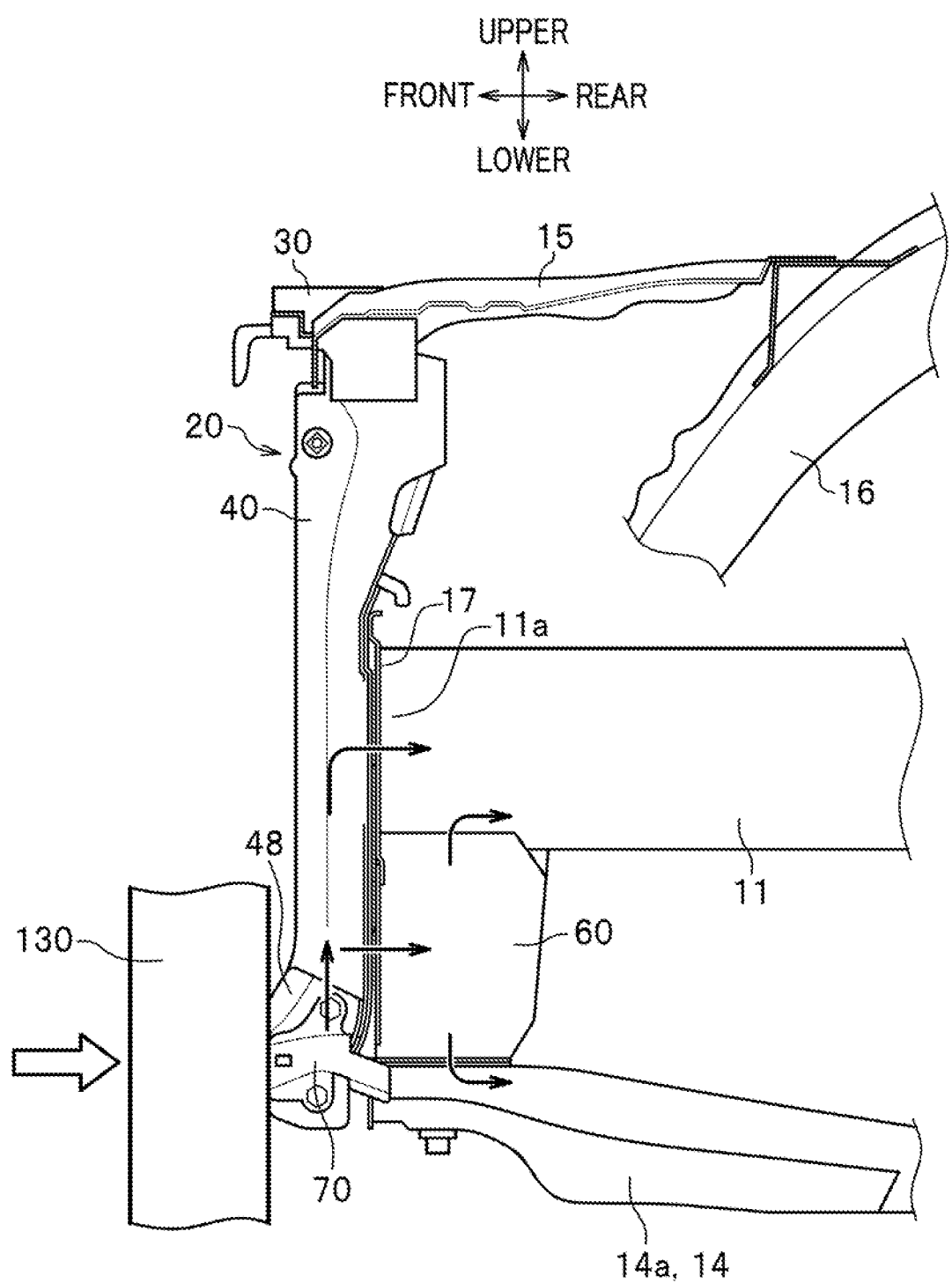
FIG. 17 is a left side view schematically illustrating transmission paths through which collision load is transmitted in the event of the small overlap collision.

FIG. 16 is a bottom view of the vehicle 10 using the vehicle body front part structure according to the embodiment of the present invention, showing a condition which happens in the event of a small overlap collision against a utility pole 130. FIG. 17 is a side view of the vehicle body front part structure, schematically showing transmission paths through which collision load is transmitted in the event of the small overlap collision.

As shown in FIG. 16, in the event of a small overlap collision of the vehicle 10 according to the embodiment against the utility pole 130 which is a collision object, the utility pole 130 collides against the first load transmission member 70, and the utility pole 130 pushes the first load transmission member 70 toward the rear. In this moment, the utility pole 130 comes into contact with two surfaces of the first load transmission member 70, that is to say, the front end part 74 and the inclined surface 72.

Thereafter, as shown in FIG. 17, the collision load is transmitted to the vertical frame part 40 via the frontward extending part 46 to which the first load transmission member 70 is connected. The collision load transmitted to the vertical frame part 40 is transmitted to the front side frame 11.

The collision load is also transmitted to the support member 60 connected to the vertical frame part 40. The collision load transmitted to the support member 60 is transmitted to both the front side frame 11 located above the support member and the front sub frame 14 located under the support member.

Thus, the front side frame 11 is deformed (bending-deformed or axially crushed), and this deformation absorbs collision energy.

Meanwhile, in the event of the small overlap collision, there is a case where that the power unit 140 including the engine and the transmission moves toward the vehicle front, and hits the lower lateral frame part 30 of the front bulkhead 20, as shown in FIG. 16.

Figure 18:
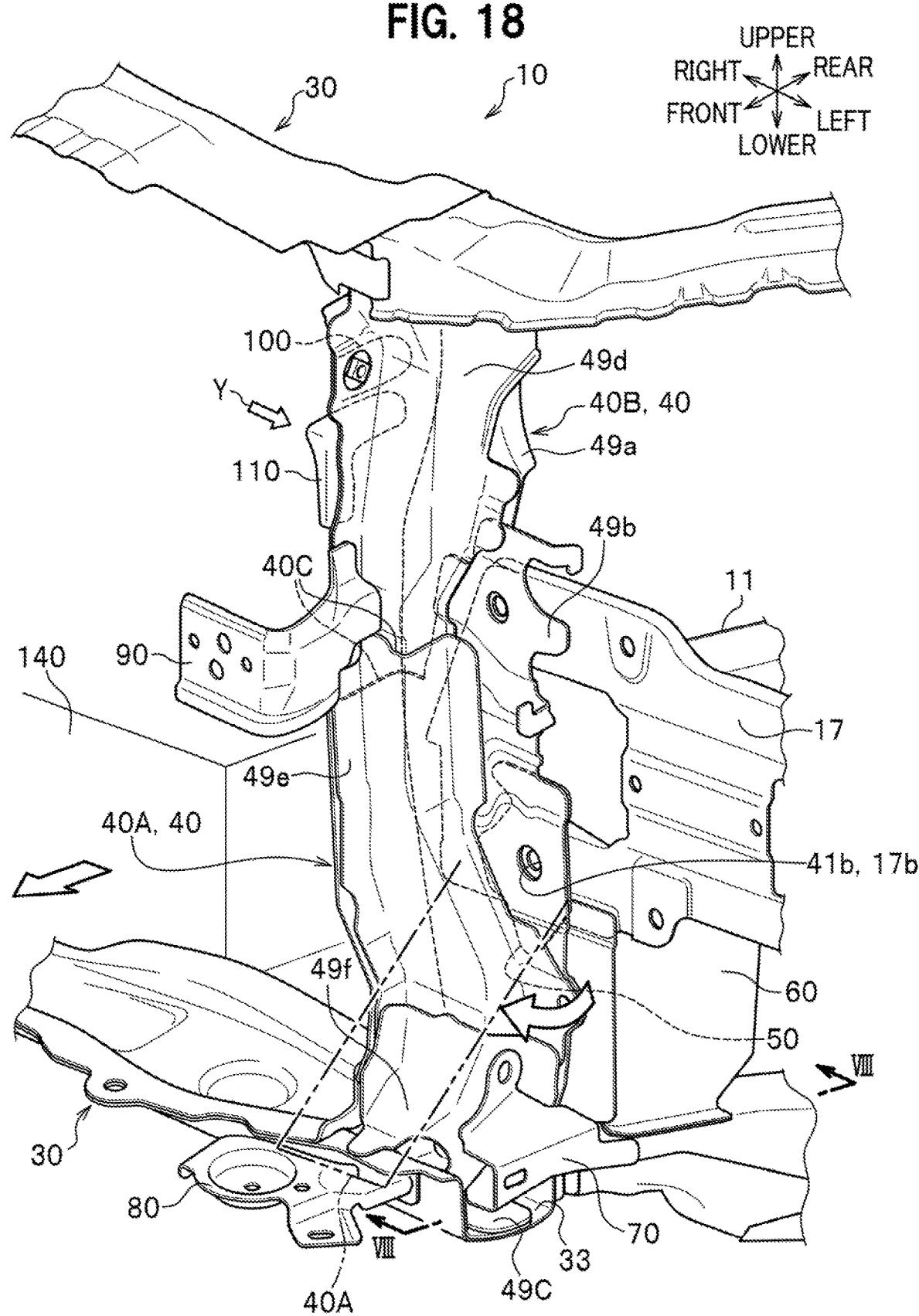
FIG. 18 is a perspective view schematically illustrating how a lower vertical frame part behaves when a power unit hits a lateral frame part.

In this case, as indicated with chain double-dashed lines in FIG. 18, the lower vertical frame part 40A goes into a condition (swing mode) in which the lower vertical frame part turns toward the vehicle front around the fixation part (the through-holes 41b, 17b) between the lower vertical frame part and the attachment plate 17 provided to the front side frame 11.

In this case, in the embodiment, the lower vertical frame part 40A with high rigidity is connected to the lower lateral frame part 30. This makes it possible for the lower vertical frame part 40A to preferably support forward load which is applied to the lower lateral frame part 30 in the event of the small overlap collision, and to inhibit further forward movement of the power unit 140.

In addition, in the embodiment, the reinforcement member reinforces the surroundings of the fixation part (the through-holes 41b, 17b) between the attachment plate 17 of the front side frame 11 and the lower vertical frame part 40A. Thus, when the swing mode occurs, stress concentrates on the reinforcement member 50. For this reason, breakage of the vehicle body attachment seat 47 can be inhibited.

Moreover, in the embodiment, the lower end portion of the vertical frame part 40 is inserted into and fixed to the open cross-sectional part 33 of the lateral frame part 30. This increases the bonding force between the lateral frame part 30 and the vertical frame part 40, and makes it possible to inhibit the swing mode.

In the embodiment, the vertical frame part 40 is formed by connecting the lower vertical frame part 40A and the upper vertical frame part 40B, and the strength of the boundary part 40C between the lower vertical frame part and the upper vertical frame part is reduced. This makes it possible to set the folded portion (vulnerable portion) in the middle of the vertical frame part 40. Furthermore, only the lower vertical frame part 40A is fixed to (supported by) the front side frame 11. This makes it possible to make the rigidity of the lower vertical frame part 40A against the collision load higher than that of the upper vertical frame part 40B. Moreover, the second load transmission member 90 projecting toward the vehicle front is fixed to the upper vertical frame part 40B, and the collision load is accordingly easy to transmit to the upper vertical frame part 40B. This makes it easy for the upper vertical frame part 40B to be deformed toward the vehicle rear from the boundary part 40C in the event of a frontal collision of the vehicle 10 (particularly, a full-flat collision). Thus, the collision detection sensor 100 fixed to the upper vertical frame part 40B can smoothly move toward the vehicle rear, and can detect the collision of the vehicle 10 quickly.

Besides, in the embodiment, the hollow cross-sectional area of the upper vertical frame part 40B, which is orthogonal to the extension direction thereof, is formed smaller than the hollow cross-sectional area of the lower vertical frame part 40A. This makes the strength and rigidity of the upper vertical frame part 40B lower than those of the lower vertical frame part 40A, and makes it easy to deform the upper vertical frame part 40B.

In addition, in the embodiment, the hat cross-sectional part 91 of the second load transmission member 90 extends in the vehicle front-rear direction, and is arranged with the crown part 91c facing the center C of the hollow part 48 on the side of the upper vertical frame part 40B. This makes the collision load, inputted to the second load transmission member 90, easy to transmit to the upper vertical frame part 40B, and makes it easy to deform the upper vertical frame part 40B.

Furthermore, in the embodiment, the attachment seat surface 92 extending in the vehicle width direction is formed in the front end portion of the second load transmission member 90. Thus, the collision load inputted from the vehicle front can be widely received by the attachment seat surface 92.

Moreover, in the embodiment, the protector 110 is located closer to the vehicle front than the collision detection sensor 100 at the position under and near the collision detection sensor 100. In the event of a frontal collision of the vehicle 10, this makes it easy for the damaged vehicle front portion to hit the protector 110 earlier than the collision detection sensor 100, and breakage of the collision detection sensor 100 can be inhibited.

Besides, in the embodiment, the front bumper beam 13 is arranged closer to the vehicle front than the second load transmission member 90. For this reason, when the front bumper beam 13 retreats in response to the frontal collision of the vehicle 10, the second load transmission member 90 is pushed toward the vehicle rear. This makes it possible to preferably transmit the collision load to the upper vertical frame part 40B to which the second load transmission member 90 is fixed. Thus, the upper vertical frame part 40B can be easily deformed, and the collision of the vehicle 10 can be detected quickly.

In addition, in the embodiment, the first load transmission member 70 located outward of the front side frame 11 in the vehicle width direction is additionally provided to the front bulkhead 20, and the gusset 19 bulging outward in the vehicle width direction is additionally provided to the outer surface of the front end portion of the front side frame 11. This makes it possible to realize the vehicle body structure capable to coping with the small overlap collision.

Although the embodiment of the present invention has been described in detail with reference to the drawings, the present invention is not limited to this embodiment. The present invention may be modified appropriately within the scope not departing from the gist or spirit of the invention.

In the embodiment, the vertical frame part 40 is formed of the six plate bodies 49a to 49f. However, the number of plate bodies to form the vertical frame part 40 may be increased or decreased appropriately.

In this embodiment, the hollow part 48 is formed in the shape of a square cylinder. However, the hollow part 48 may be formed, for example, in the shape of a polygonal cylinder other than a circular cylinder and a square cylinder.

Next, referring to the drawings, detailed descriptions will be provided for a second embodiment of the present invention. In the descriptions, the same components are denoted by the same reference sign, and duplicated descriptions will be omitted. Incidentally, "front-rear," "upper-lower," and "left-right" indicated by arrows in each drawing respectively represent the vehicle front-rear direction, the vehicle upper-lower direction, and the left-right direction (the vehicle width direction) viewed from the driver's seat. Furthermore, each drawing omits bolts B and nuts whenever deemed appropriate. Moreover, in the following descriptions, a plane including an upper-lower axis and a left-right axis (a plane orthogonal to a front-rear axis) is referred to as a frontal plane; a plane including the upper-lower axis and the front-rear axis (a plane orthogonal to the left-right axis) is referred to as an arrow-shaped plane; and a plane including the front-rear axis and the left-right axis (a plane orthogonal to the upper-lower axis) is referred to as a horizontal plane.

<Vehicle Body Front Part Structure>

Figure 19:
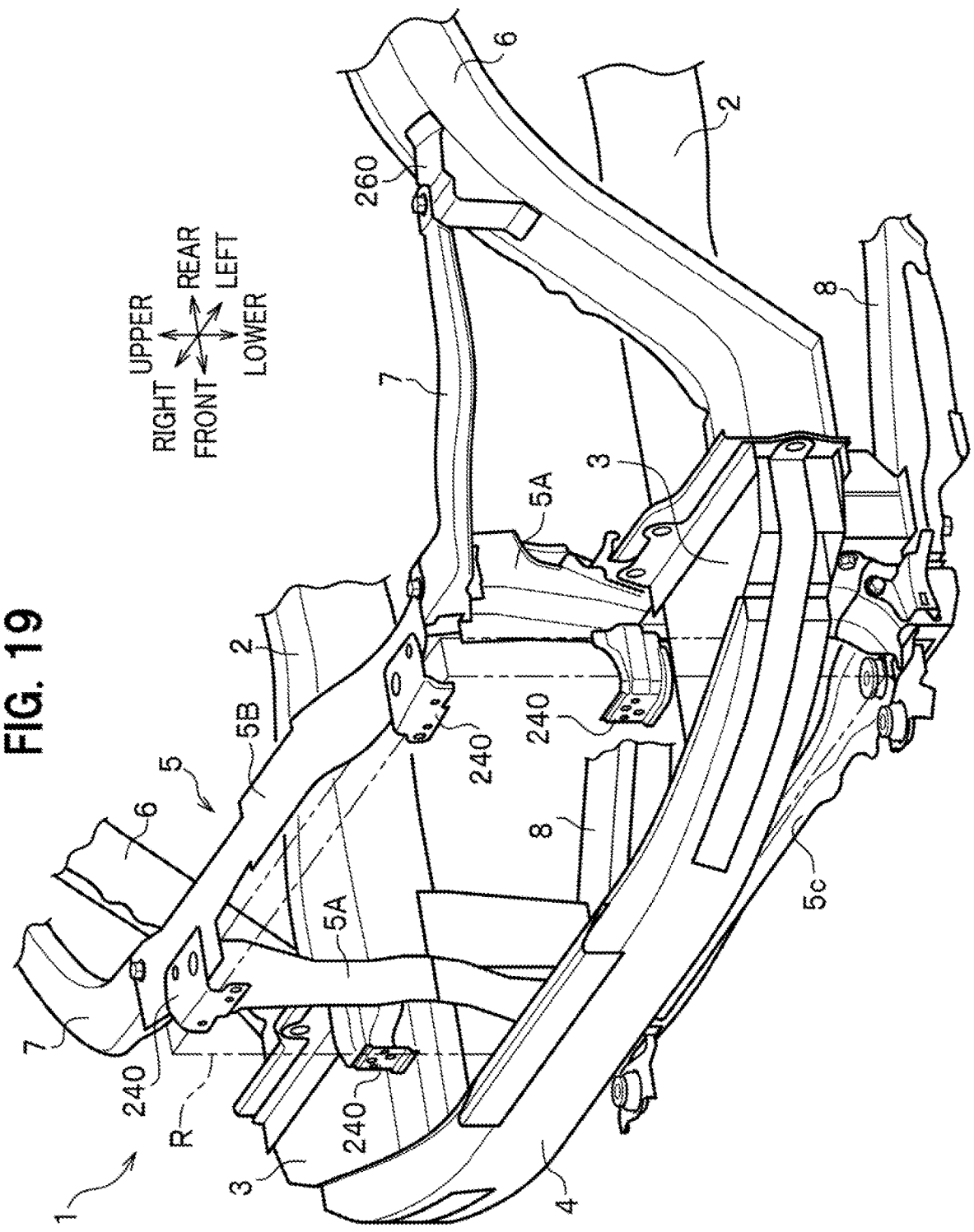
FIG. 19 is a perspective view illustrating a vehicle body front part structure according to a second embodiment of the present invention.

As shown in FIG. 19, a vehicle body front part structure 1 for a vehicle according to a second embodiment of the present invention includes: a pair of left and right front side frames 2, 2, a pair of left and right bumper beam extensions 3, 3, a front bumper beam 4, a front bulkhead 5, a pair of left and right lower members 6, 6, a pair of left and right upper members 7, 7, and a pair of left and right front-rear frames 8, 8.

<Front Side Frames>

The pair of left and right front side frames (also referred to as front side members) 2, 2 are each a metal-made structural member extending in the front-rear direction. The front side frames 2, 2 are each formed as a hollow structure having a closed cross section on the frontal plane, for example, by assembling rolled steel plates each having a U-shaped cross section. Front end portions of the front side frames 2, 2 are attached to height-direction middle portions of a pair of left and right vertical frame parts 5A, 5A of the front bulkhead 5, respectively.

<Bumper Beam Extensions>

The pair of left and right bumper beam extensions (also referred to as crush cans) 3, 3 are metal-made members attached to the front end portions of the pair of left and right front side frames 2, 2, respectively. The bumper beam extensions 3, 3 each have a box shape having a hollow structure, and are formed more vulnerable than the front bumper beam 4 and the front side frames 2, 2 by selecting their material, thickness and the like. In the event of a frontal collision of the vehicle, the bumper beam extensions 3, 3 are crushed in the front-rear direction by the frontal collision load, and thus absorbs impact.

<Front Bumper Beam>

The front bumper beam 4 is a metal-made member hung between front end portions of the pair of left and right bumper beam extensions 3, 3 at the same height as the front end portions of the pair of left and right front side frames 2, 2.

<Front Bulkhead>

Figure 20:
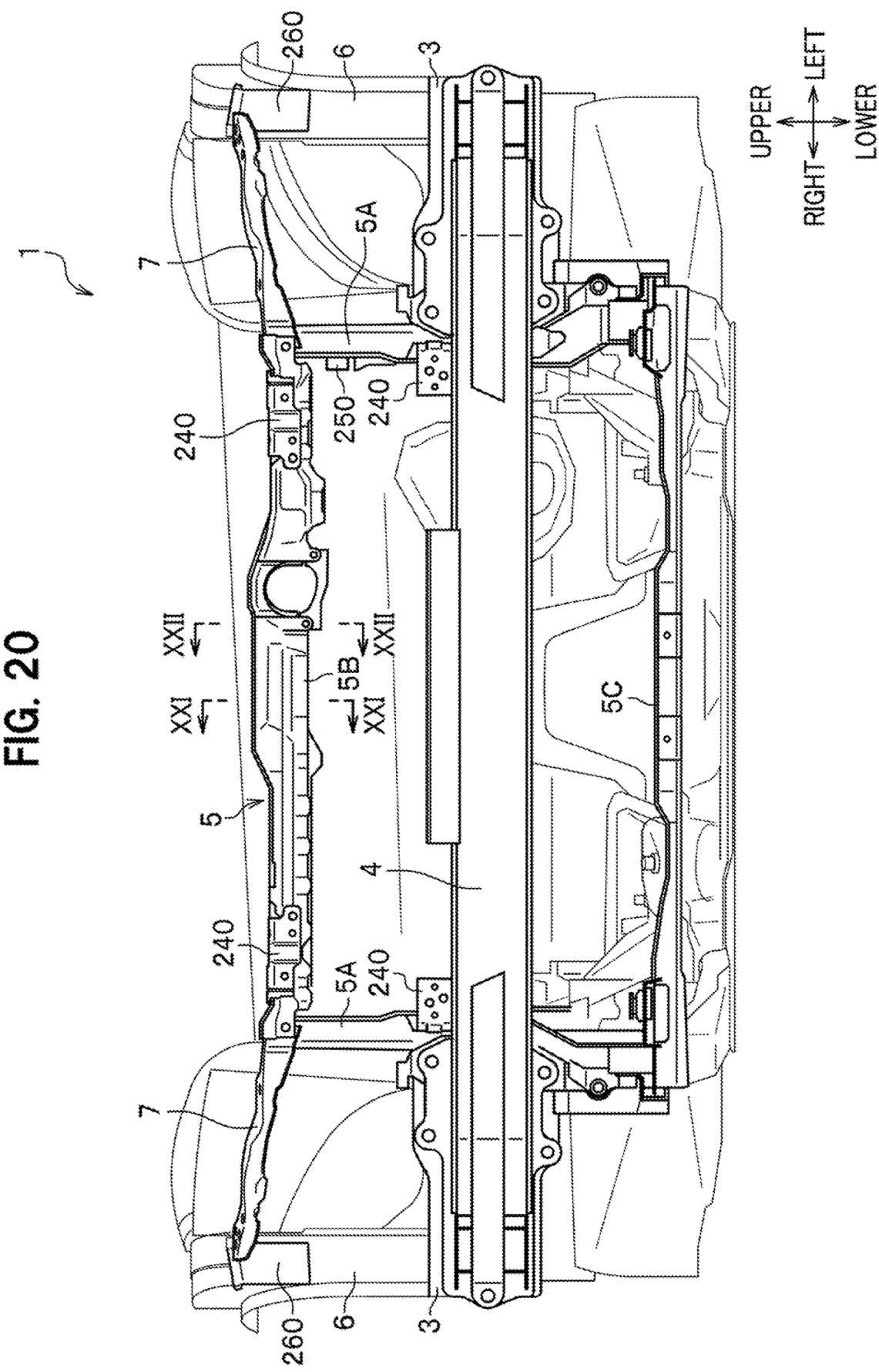
FIG. 20 is a front view illustrating the vehicle body front part structure according to a second embodiment of the present invention.

As shown in FIG. 20, the front bulkhead 5 is a metal-made structural member which had a rectangular frame shape in its front view. A power installation compartment of the vehicle is behind the front bulkhead 5. The front bulkhead 5 includes: the pair of left and right vertical frame parts 5A, 5A; a first lateral frame part 5B hung between upper end portions of the pair of left and right vertical frame parts 5A, 5A; and a second lateral frame part 5C hung between lower end portions of the pair of left and right vertical frame parts 5A, 5A.

<Vertical Frame Parts>

The pair of left and right vertical frame parts 5A, 5A are each a metal-made structural member providing extending in the upper-lower direction. The vertical frame parts 5A, 5A are each formed as a hollow structure having a closed cross section on the horizontal plane, for example, by assembling multiple rolled steel plates.

<First Lateral Frame Part>

Figure 21:
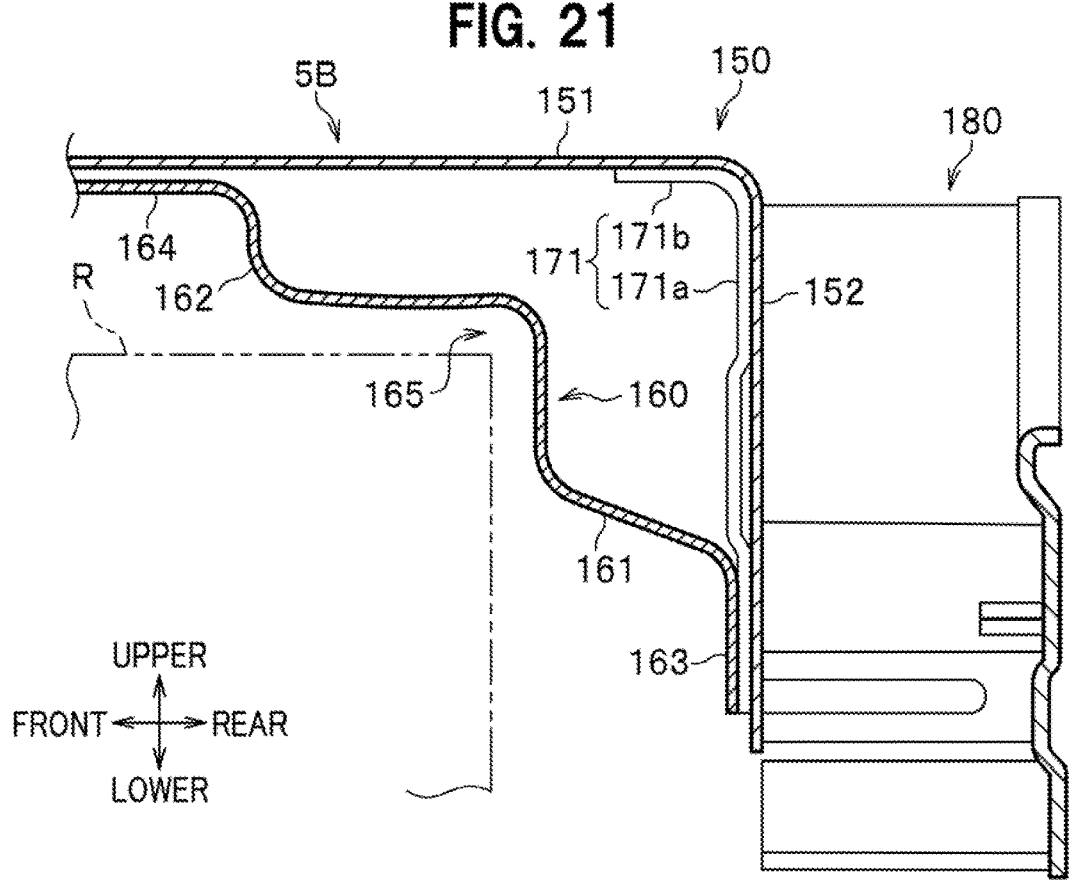
FIG. 21 is a cross-sectional view taken along the XXI-XXI line of FIG. 20.
Figure 22:
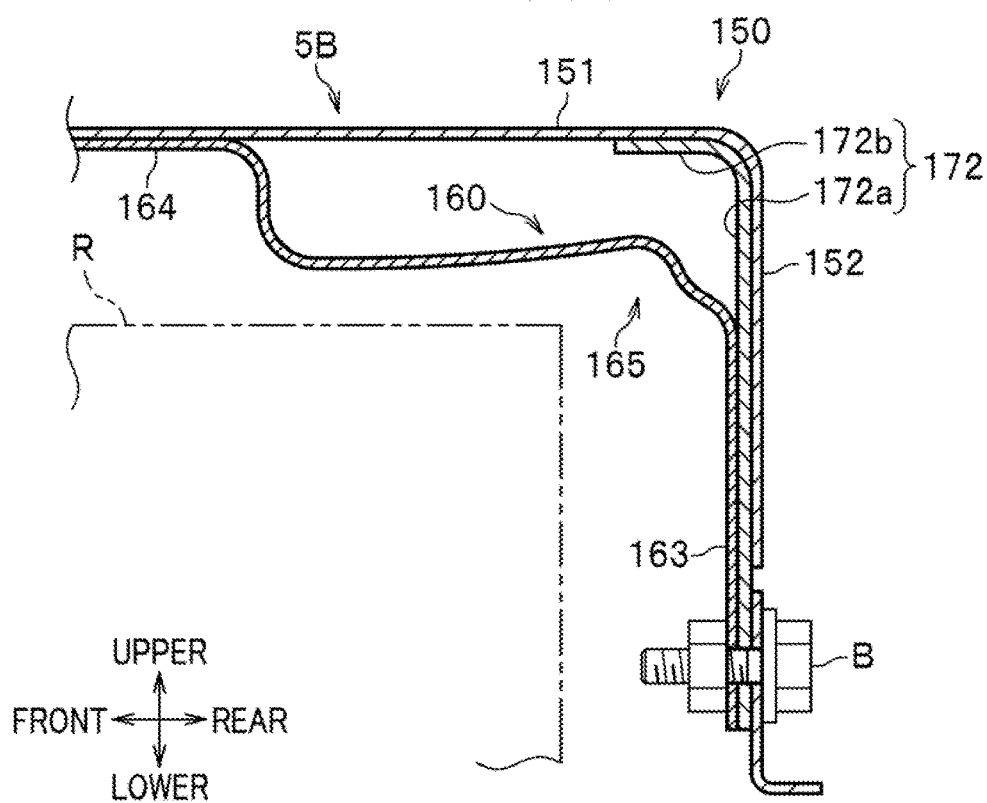
FIG. 22 is a cross-sectional view taken along the XXII-XXII line of FIG. 20.

The first lateral frame part 5B is a metal-made structural member extending in the left-right direction. The first lateral frame part 5B is formed as a hollow structure having a closed cross section on the arrow-shaped plane, for example, by assembling multiple rolled steel plates. The first lateral frame part 5B is detachably hung between the upper end portions of the pair of left and right vertical frame parts 5A, 5A. As shown in FIGS. 21 and 22, the first lateral frame part 5B includes a rear-side member 150 and a front-side member 160.

<<Rear-side Member>>

The rear-side member 150 is a metal-made member forming an upper wall portion of a rear wall portion of the first lateral frame part 5B. In its side view, the rear-side member 150 is shaped like the overturned letter L. The rear-side member 150 integrally includes an upper wall part 151 and a rear wall part 152.

The upper wall part 151 is a part forming the upper wall portion of the first lateral frame part 5B, and extends on the horizontal plane. The rear wall part 152 is a part forming the rear wall portion of the first lateral frame part 5B, as well as extends downward from a rear end portion of the upper wall part 151 and extends on the frontal plane.

Figure 23:
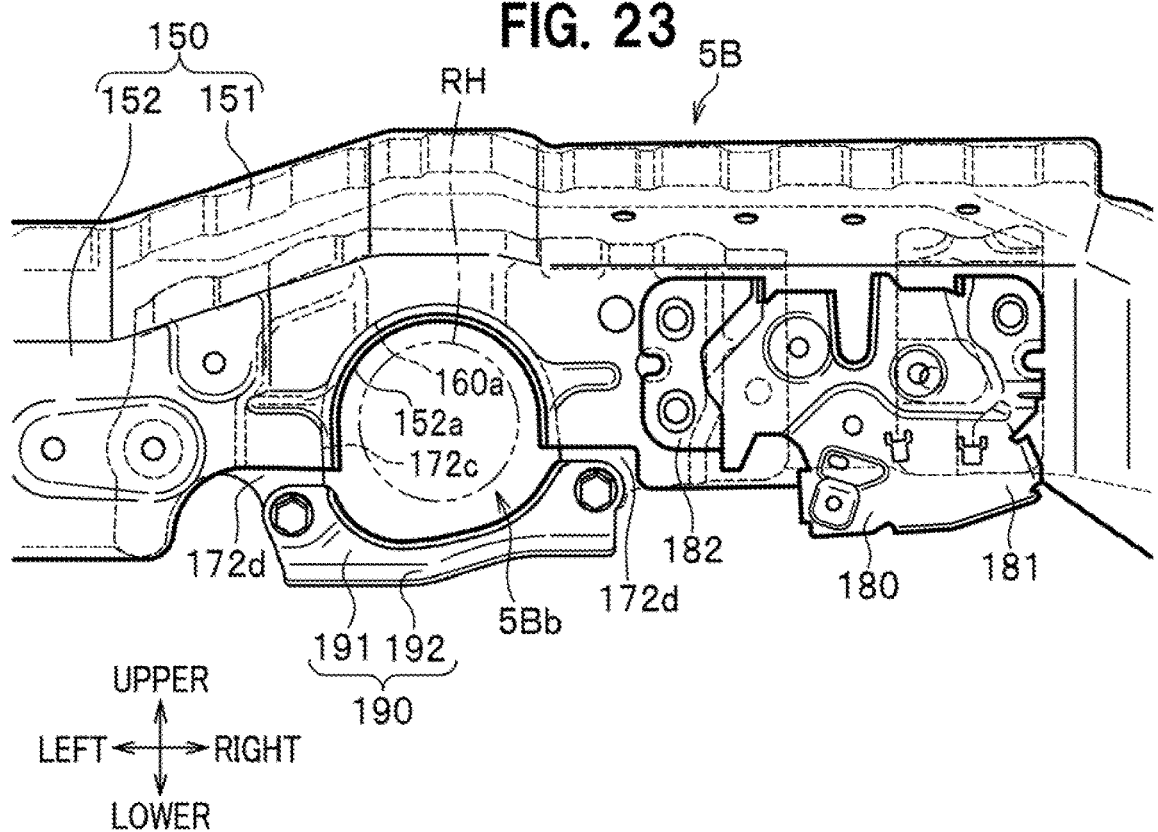
FIG. 23 is a partially magnified view of a first lateral frame part of FIG. 19 from rear.

As shown in FIG. 23, a relief part 152a is formed in the rear wall part 152. The relief part 152a is a cut part which has an opening in a lower end portion of the rear wall part 152.

<<Front-Side Member>>

As shown in FIGS. 21 and 22, the front-side member 160 is a member forming a lower wall portion of a front wall portion of the first lateral frame part 5B. The front-side member 160 integrally includes a lower wall part 161, a front wall part 162, and flange parts 163, 164.

The lower wall part 161 is a part forming a lower wall portion of the first lateral frame part 5B, and extends on the horizontal plane. The front wall part 162 is a part forming a front wall portion of the first lateral frame part 5B, as well as extends upward from a front end portion of the lower wall part 161 and extends on the frontal plane.

The flange part 163 is a part extending downward from a rear end portion of the lower wall part 161, and extends on the frontal plane. The flange part 163 is joined to the rear wall part 152 of the rear-side member 150 by welding or the like. The flange part 164 is a part extending frontward from an upper end portion of the front wall part 162, and extends on the horizontal plane. The flange part 164 is joined to the upper wall part 151 of the rear-side member 150 by welding or the like.

A recess part 165 is formed in the front-side member 160. The recess part 165 is a part obtained by denting the lower wall part 161 and the front wall part 162 of the front-side member upward and rearward. The recess part 165 accommodates an upper end portion of a radiator R.

Figure 24:
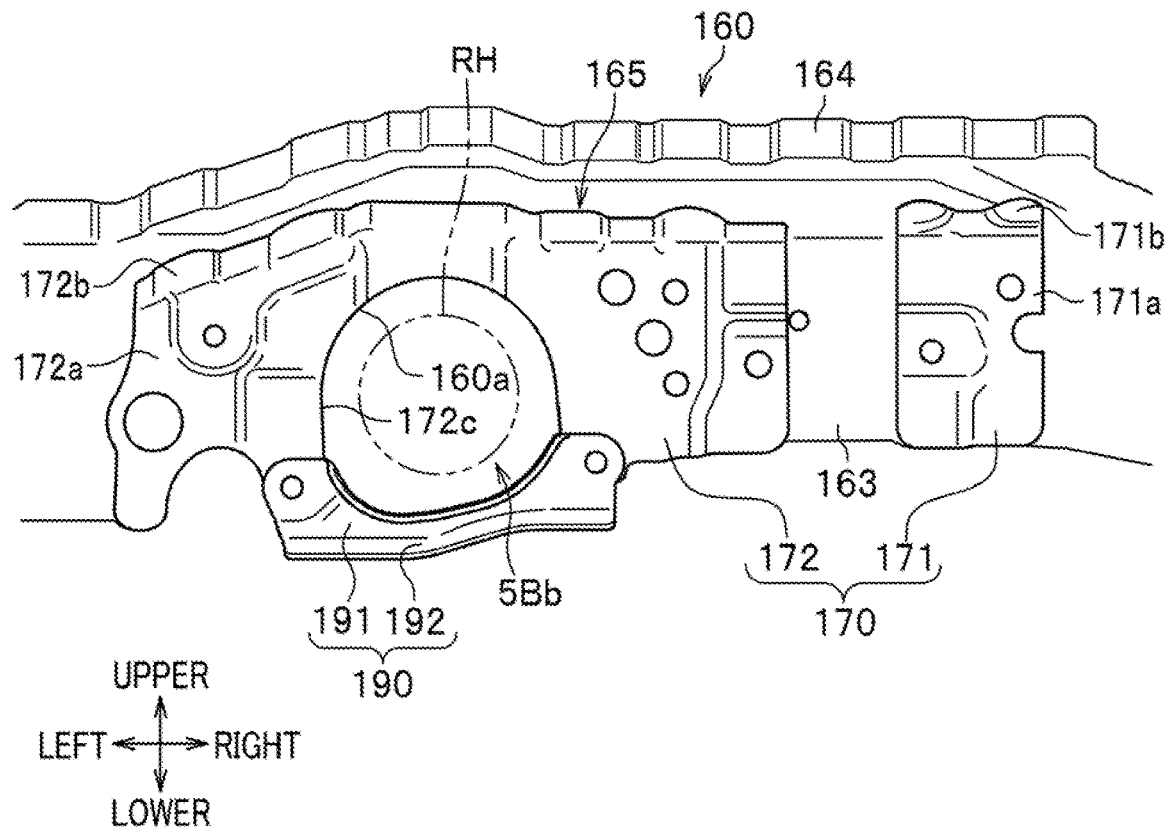
FIG. 24 is a partially magnified view of the first lateral frame part of FIG. 19 from the rear, with a hood Lock bracket and a rear-side member detached from the first lateral frame part.

As shown in FIG. 24, a relief part 160a is formed in the front-side member 160. At a position where in its front view, the relief part 160a overlaps the relief part 152a of the rear-side member 150, the relief part 160a is formed in the same shape as the relief part 152a.

<Reinforcement Member, a Hood Lock Bracket, and Hung Member>

As shown in FIGS. 23 and 24, the vehicle body front part structure 1 includes a reinforcement member 170, a hood lock bracket 180 and a hung member 190 which are accessory parts of the first lateral frame part 5B. Incidentally, FIGS. 23 and 24 are rear views of the first lateral frame part 5B from slightly above the first lateral frame part.

<<Reinforcement Member>>

The reinforcement member 170 is a metal-made plate-shaped member for reinforcing the first lateral frame part 5B. The reinforcement member 170 is provided between the rear-side member 150 and the front-side member 160. The reinforcement member 170 includes a first plate part 171 and a second plate part 172. In other words, the reinforcement member 170 is divided into the first plate part 171 and the second plate part 172 in the vehicle width direction. The first plate part 171 and the second plate part 172 are away from each other, a portion of the first lateral frame part 5B between the first plate part 171 and the second plate part 172 serves as a vulnerable portion.

<<First Plate Part>>

The first plate part 171 is a member for reinforcing one vehicle-width-direction end part 181 of the hood lock bracket 180. The first plate part 171 integrally includes a first wall part 171a and a second wall part 171b.

The first wall part 171a extends on the frontal plane, and is formed having a size covering the entirety of the rear wall part 152 in the height direction of the rear wall part. The first wall part 171a is provided between the flange part 163 of the front-side member 160 and the rear wall part 152 of the rear-side member 150. The first wall part 171a is joined to the flange part 163 and the rear wall part 152 by welding or the like.

The second wall part 171b extends frontward from an upper end portion of the first wall part 171a, and extends on the horizontal plane. The second wall part 171b is provided in contact with a lower surface of the upper wall part 151 of the rear-side member 150. The second wall part 171b is joined to the upper wall part 151 by welding or the like.

<<Second Plate Part>>

The second plate part 172 is a part for reinforcing the surroundings of the other vehicle-width-direction end part 182 of the hood lock bracket 180 and the relief parts 152a, 160a. The second plate part 172 integrally includes: a first wall part 172a covering the entirety of the rear wall part 152 in the height direction of the rear wall part; and a second wall part 172b extending frontward from an upper end portion of the first wall part 172a.

The first wall part 172a extends on the frontal plane, and is formed having a size covering the entirety of the rear wall part 152 in the height direction of the rear wall part. The first wall part 172a is provided between the flange part 163 of the front-side member 160 and the rear wall part 152 of the rear-side member 150. The first wall part 172a is joined to the flange part 163 and the rear wall part 152 by welding or the like.

The second wall part 172b extends frontward from the upper end portion of the first wall part 172a, and extends on the horizontal plane. The second wall part 172b is provided in contact with the lower surface of the upper wall part 151 of the rear-side member 150. The second wall part 172b is joined to the upper wall part 151 by welding or the like.

A relief part 172c is formed in the second plate part 172. At a position where in its front view, the relief part 172c overlaps the relief part 152a of the rear-side member 150 and the relief part 160a of the front-side member 160, the relief part 172c is formed in the same shape as the relief parts 152a, 160a.

A pair of attached parts 172d, 172d are formed in the second plate part 172. The pair of attached parts 172d, 172d are formed in lower edge portions of the second plate part 172 which are the two end portions of the relief part 172c in the vehicle width direction, and are exposed from the rear wall part 152 of the rear-side member 150 in their rear view. The hung member 190 is attached to the pair of attached parts 172d, 172d.

<<Hood Lock Bracket>>

The hood lock bracket 180 is a metal-made bracket with which a lock member (not shown) of a hood for covering an upper portion of the power installation compartment in openable and closable way is brought into engagement. Near the relief parts 152a, 160a, 172c, the hood lock bracket 180 is attached to a rear surface of the rear wall part 152 of the rear-side member 150.

The one vehicle-width-direction end part 181 of the hood lock bracket 180 is a part to be fixed to the rear-side member 150. The one vehicle-width-direction end part 181 is placed over the rear wall part 152 of the rear-side member 150 and the first wall part 171a of the first plate part 171, and they are bolted together using bolts from the rear.

The other vehicle-width-direction end part 182 of the hood lock bracket 180 is a part to be fixed to the rear-side member 150. The other vehicle-width-direction end part 182 is placed over the rear wall part 152 of the rear-side member 150 and the first wall part 172a of the second plate part 172, and they are bolted together using bolts from the rear.

In other words, the hood lock bracket 180 is fixed to the rear-side member 150 at the left and right end parts 181, 182. The one vehicle-width-direction end part 181 is reinforced by the first plate part 171, while the other vehicle-width-direction end part 182 is reinforced by the second plate part 172.

<<Hung Member>>

The hung member 190 is a metal-made member hung among the relief parts 152a, 160a, 172c. The hung member 190 integrally includes a main body part 191 and a flange part 192.

The main body part 191 extends on the frontal plane, and is hung between the pair of attached parts 172d, 172d. The two vehicle-width-direction end portions of the main body part 191 are respectively bolted to the pair of attached parts 172d, 172d using bolts from the rear.

The flange part 192 extends rearward from a lower end portion of the main body part 191, and extends on the horizontal plane.

An upper edge portion of the main body part 191 is formed in the shape of a curve projecting downward. Together with the relief parts 152a, 160a, 172c, the main body part 191 forms a hole part (radiator hose insertion hole) 5Bb which is substantially circular in its front view. A radiator hose RH is inserted through the hole part 5Bb. The radiator hose RH is a hose for supplying coolant, cooled in the radiator R, to cooled parts (the engine and the like), or supplying coolant, heated through heat exchange in the cooled parts, to the radiator R.

<Second Lateral Frame Part>

Figure 25:
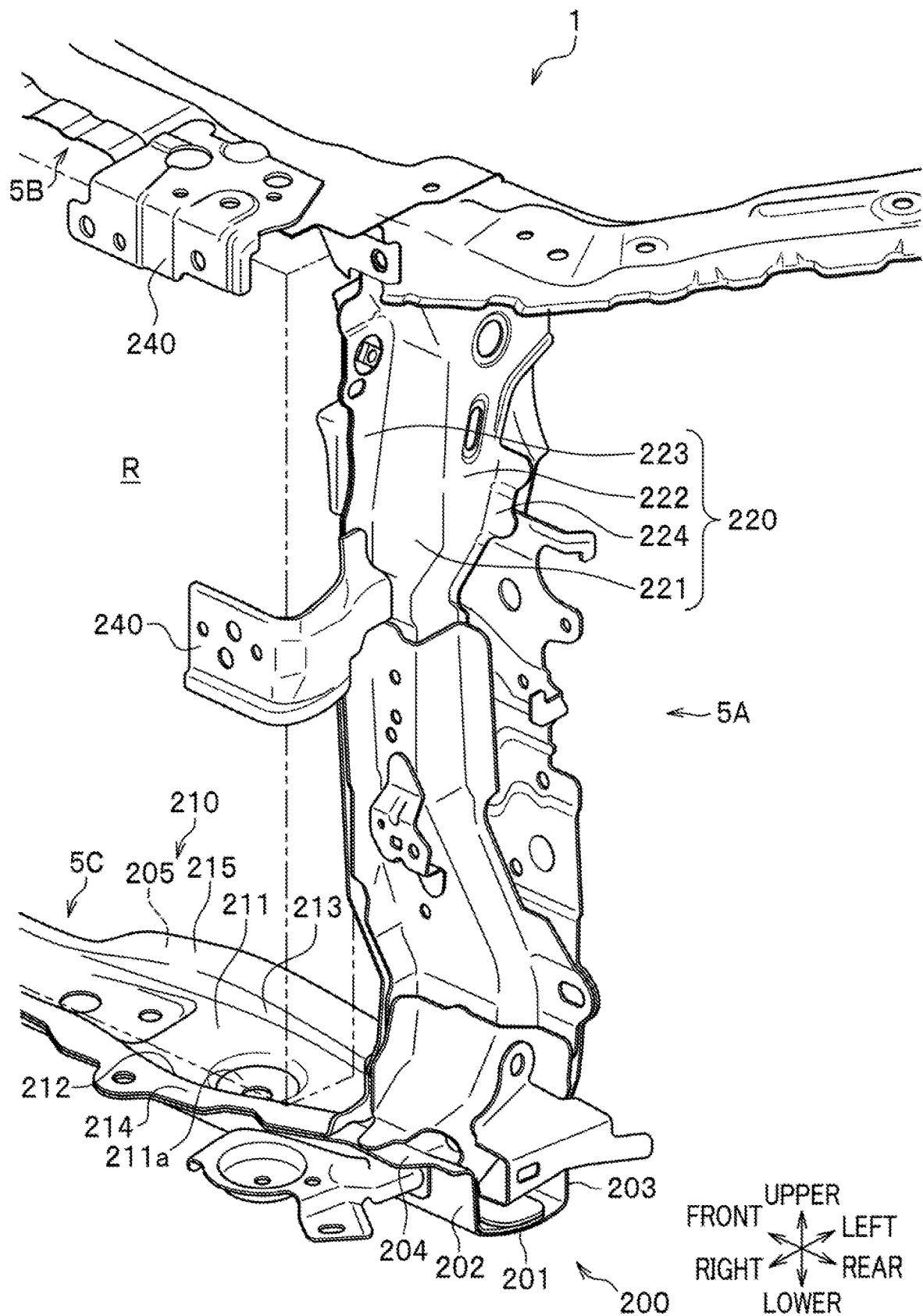
FIG. 25 is a perspective view illustrating a front bulkhead.

As shown in FIG. 25, the second lateral frame part 5C is a metal-made structural member extending in the left-right direction. The second lateral frame part 5C is formed as a hollow structure having a closed cross section on the arrow-shaped plane, for example, by assembling multiple rolled steel plates. The second lateral frame part 5C is hung between the lower end portions of the pair of left and right vertical frame parts 5A, 5A. The second lateral frame part 5C includes a lower member 200 and a lid member 210.

<<Lower Member>>

The lower member 200 is a metal-made member forming a lower wall portion, a front wall portion and a rear wall portion of the second lateral frame part 5C. In its side view, the lower member 200 has a hat shape which is open upward. The lower member 200 includes a lower wall part 201, a front wall part 202, a rear wall part 203, and flange parts 204, 205.

The lower wall part 201 is a part forming the lower wall portion of the second lateral frame part 5C, and extends on the horizontal plane. The front wall part 202 is a part forming the front wall portion of the second lateral frame part 5C, as well as extends upward from a front end portion of the lower wall part 201, and extends on the frontal plane. The rear wall part 203 is a part forming the rear wall portion of the second lateral frame part 5C, as well as extends upward from a rear end portion of the lower wall part 201, and extends on the frontal plane.

The flange part 204 is a part extending frontward from an upper end portion of the front wall part 202, and extends on the horizontal plane. The flange part 205 is apart extending rearward from an upper end portion of the rear wall part 203, and extends on the horizontal plane.

<<Lid Member>>

The lid member 210 is a metal-made member closing an upward opening of the lower member 200, and forming an upper wall portion of the second lateral frame part 5C. In its side view, the lid member 210 has a hat shape whose upward opening is smaller than that of the lower member 200. The lid member 210 includes an upper wall part 211, a front wall part 212, a rear wall part 213, and flange parts 214, 215.

The upper wall part 211 is a part forming the upper wall portion of the second lateral frame part 5C, and extends on the horizontal plane. The front wall part 212 is a part extending upward from a front end portion of the upper wall part 211, and extends on the frontal plane. The rear wall part 213 is a part extending upward from a rear end portion of the upper wall part 211, and extends on the frontal plane.

The flange part 214 is a part extending frontward from an upper end portion of the front wall part 212, and extends on the horizontal plane. The flange part 214 is joined to the flange part 204 of the lower member 200 by welding or the like. The flange part 215 is a part extending rearward from an upper end portion of the rear wall part 213, and extends on the horizontal plane. The flange part 215 is joined to the flange part 205 of the lower member 200 by welding or the like.

<Structure of Upper Portion of Vertical Frame Part>

Figure 26:
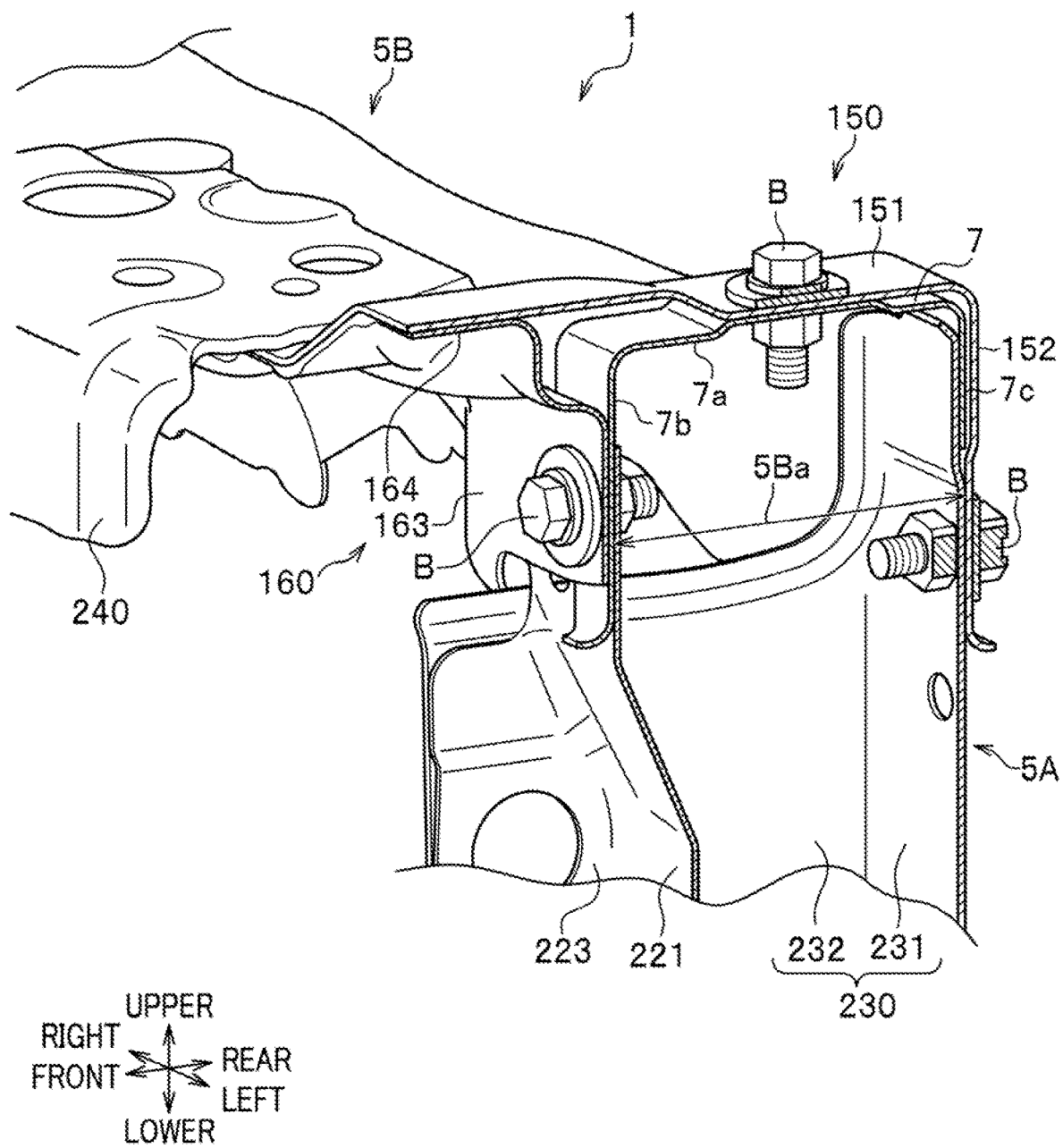
FIG. 26 is a perspective view illustrating an upper corner portion of the front bulkhead.
Figure 27:
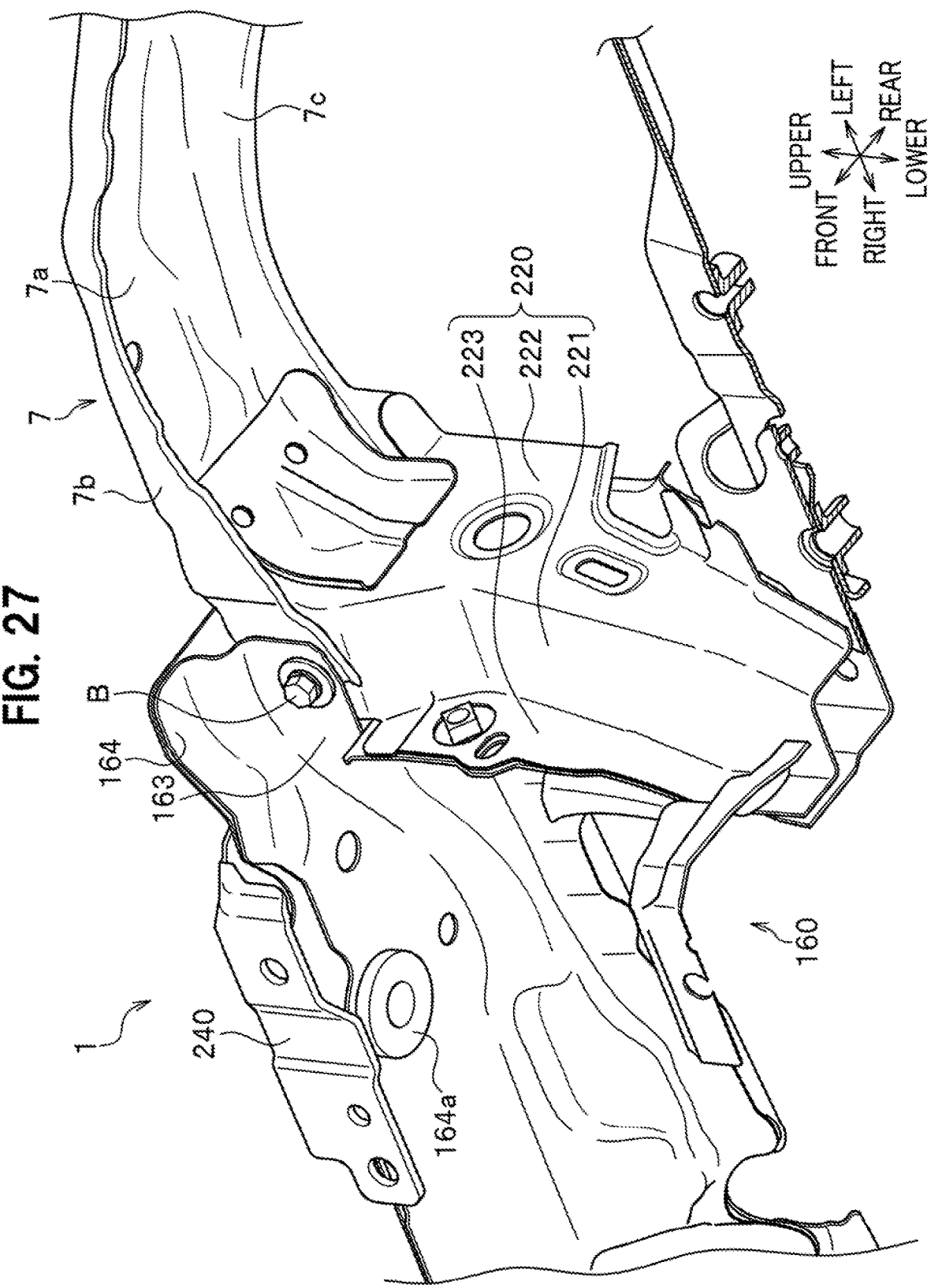
FIG. 27 is a perspective view illustrating the upper corner portion of the front bulkhead.

Here, referring to FIGS. 25 to 27, descriptions will be provided for a structure of an upper portion of the vertical frame part 5A. The upper portion of the vertical frame part 5A includes a front-side member 220 and a rear-side member 230.

<<Front-Side Member>>

As shown in FIG. 25, the front-side member 220 is a metal-made member forming a front wall portion and an outer wall portion of the vertical frame part 5A. The front-side member 220 integrally includes a front wall part 221, an outer wall part 222, and flange parts 223, 224.

The front wall part 221 is a part forming the front wall portion of the vertical frame part 5A, and extends on the frontal plane. The outer wall part 222 is a part forming the outer wall portion of the vertical frame part 5A, as well as extends rearward from a vehicle-width-direction outer end portion of the front wall part 221, and extends on the arrow-shaped plane.

The flange part 223 extends frontward from a vehicle-width-direction inner end portion of the front wall part 221, and extends on the arrow-shaped plane. The flange part 223 is joined to an inner wall part 232, although described later, of the rear-side member 230 by welding or the like. The flange part 224 extends toward the outside in the vehicle width direction from a rear end portion of the outer wall part 222, and extends on the frontal plane. The flange part 224 is joined to a rear wall part 231, although described later, of the rear-side member 230 by welding or the like.

<<Rear-Side Member>>

The rear-side member 230 is a metal-made member forming a rear wall portion and an inner wall portion of the vertical frame part 5A. The rear-side member 230 integrally includes a rear wall part 231, and an inner wall part 232.

The rear wall part 231 is a part forming the rear wall portion of the vertical frame part 5A, and extends on the frontal plane. The inner wall part 232 is a part forming the inner wall portion of the vertical frame part 5A, as well as extends frontward from a vehicle-width-direction inner end portion of the rear wall part 231, and extends on the arrow-shaped plane. In addition, a collision detection sensor 250 (see FIG. 20) for detecting collision of the vehicle is attached to the inner wall part 232 of one vertical frame part 5A.

<Lower Members>

The pair of left and right lower members 6, 6 are metal-made structural members extending in the front-rear direction outside the pair of left and right front side frames 2, 2 in the vehicle width direction, respectively. The lower members 6, 6 are each formed as a hollow structure having a closed cross section on the frontal plane, for example, by assembling multiple rolled steel plates. Front end portions of the lower members 6 are respectively joined to rear end portions of the bumper beam extensions 3 by welding or the like. Furthermore, the lower members 6 are formed by being bent in a way that makes the lower members becomes higher toward the rear.

<Upper Members>

The pair of left and right upper members 7, 7 are metal-made structural members extending in the front-rear direction. The pair of left and right upper members 7, 7 are hung between upper left and right corners of the front bulkhead 5 and the pair of left and right lower members 6, 6, respectively. In the embodiment, rear end portions of the upper members 7 are fixed to upper wall portions of the lower members 6 with the assistance of bracket members 260, respectively. Each upper member 7 integrally includes an upper wall part 7a, an outer wall part 7b and an inner wall part 7c.

The upper wall part 7a extends on the horizontal plane. The outer wall part 7b extends downward from a vehicle-width-direction outer end portion of the upper wall part 7a, and extends in the arrow-shaped plane. The inner wall part 7c extends downward from a vehicle-width-direction inner end portion of the upper wall part 7a, and extends in the arrow-shaped plane. Incidentally, a front end portion of the upper member 7 is formed by being bent inward in the vehicle width direction. Thus, front end portions of the outer and inner wall parts 7b, 7c extend on the frontal plane.

<Front-Rear Frames>

The pair of left and right front-rear frames 8, 8 are frames forming portions of the front sub frames, and are metal-made structural members extending in the front-rear direction. Front end portions of the pair of left and right front-rear frames 8, 8 are joined to rear end portions of lower left and right corner portions of the front bulkhead 5 by welding or the like.

<Structure for Attaching First Lateral Frame Part to Vertical Frame Part>

As shown in FIG. 26, downward-facing openings 5Ba are formed in the two vehicle-width-direction end portions of the first lateral frame part 5B. An upper end portion of each vertical frame part 5A is inserted into the corresponding opening 5Ba.

In a part of the first lateral frame part 5B where the opening 5Ba is formed, a front wall portion, a rear wall portion and an upper wall portion of the first lateral frame part 5B forma bolt fastening seat. Specifically, the flange part 163 of the front-side member 160 of the first lateral frame part 5B, the outer wall part 7b of the upper member 7, and the front wall part 221 of the vertical frame part 5A are bolted together using a bolt B from the front. In addition, the rear wall part 152 of the rear-side member 150 of the first lateral frame part 5B, and the rear wall part 231 of the vertical frame part 5A are bolted together using a bolt B from the rear. Furthermore, the upper wall part 151 of the rear-side member 150 of the first lateral frame part 5B, and the upper wall part 7a of the upper member 7 are bolted together using a bold B from above. The first lateral frame part 5B can be detached from the pair of left and right vertical frame parts 5A, 5A by undoing these boltings.

<Structure for Attaching Radiator>

As shown in FIG. 25, an attachment part 211a is formed in the upper wall part 211 of the lid member 210 of the second lateral frame part 5C. A lower end portion of the radiator R is attached to the attachment part 211a. In the embodiment, the lower end portion of the radiator R attached to the attachment part 211a is bolted to the attachment part using a bolt B from under the lower wall part 201 of the lower member 200.

As shown in FIG. 27, an attachment part 164a is formed in the flange part 164 of the front-side member 160 of the first lateral frame part 5B. An upper end portion of the radiator R is attached to the attachment part 164a. In the embodiment, the upper end portion of the radiator R attached to the attachment part 164a is bolted to the attachment part using a bolt from above the upper wall part 151 of the rear-side member 150 and bracket members 240.

The vehicle body front part structure 1 includes multiple bracket members 240. Of the multiple bracket members 240, a pair of brackets 240 provided to the two vehicle-width-direction end portions of the first lateral frame part 5B have a part extending downward, and extending on the frontal plane. A front surface of the upper end portion of the radiator R is attached to the part.

In addition, of the multiple bracket members 240, a pair of left and right bracket members 240 provided to the pair of left and right vertical frame parts 5A, 5A have a part extending inward in the vehicle width direction, and extending on the frontal plane. A front surface of a vehicle-width direction end portion of the radiator R is attached to the part.

The vehicle body front part structure 1 according to the embodiment of the present invention makes it possible to detach the hung member 190 from the first lateral frame part 5B, and the first lateral frame part 5B from the pair of left and right vertical frame parts 5A, 5A, while the radiator hose RH is left connected to the radiator R and the like.

Thus, the vehicle body front part structure 1 makes it unnecessary that the coolant be drained before the maintenance of the radiator R, and accordingly enables the maintenance of the radiator R to be performed easily.

Furthermore, when the hood of the power installation chamber (the engine compartment) is closed, the vehicle body front part structure 1 can prevent load working on the hood lock bracket 180 from being concentrated on the relief parts 152a, 160a which are the vulnerable parts, by dispersing the load to the reinforcement member 170 and the hung member 190.

The vehicle body front part structure 1, therefore, can prevent the deformation of the first lateral frame part 5B due to the load.

Moreover, since the reinforcement member 170 makes up for the rigidity around the relief parts 152a, 160a of the first lateral frame part 5B, the vehicle body front part structure 1 can enhance freedom in designing the relief parts 152a, 160a and the radiator hose RH.

Besides, since the upper end portion of the radiator R is accommodated in the recess part 165 of the first lateral frame part 5B, the vehicle body front part structure 1 makes it possible to arrange the radiator R closer to the power installation chamber (the engine compartment).

The vehicle body front part structure 1, therefore, can enhance the freedom in designing the radiator hose RH, and achieve a reduction of the size of the vehicle in the front-rear direction.

In addition, since the reinforcement member 170 makes up for the rigidity around the relief parts 152a, 160a of the first lateral frame part 5B, the vehicle body front part structure 1 can enhance the freedom in designing the relief parts 152a, 160a and the radiator hose RH.

Furthermore, since the hung member 190 includes the flange part 192, the vehicle body front part structure 1 can increase the rigidity around the relief parts 152a, 160a.

Moreover, since the hung member 190 is hung from the reinforcement member 170, the vehicle body front part structure 1 makes it possible to easily detach the hung member 190.

Besides, in the vehicle body front part structure 1, the upper end portion of the radiator R is attached to the attachment part 164a in the lower portion of the first lateral frame part 5B, while the lower end portion of the radiator R is attached to the attachment part 211a in the upper portion of the second lateral frame part 5C.

Thus, the vehicle body front part structure 1 makes it possible to arrange the radiator R closer to the power installation chamber (the engine compartment), as well as can enhance the freedom in designing the radiator hose RH and achieve a reduction in the size of the vehicle in the front-rear direction.

In addition, since the upper end portion of the vertical frame part 5A inserted in the opening 5Ba is bolted to the first lateral frame part 5B, the vehicle body front part structure 1 can enhance the bonding strength of the connection part between the first lateral frame part 5B and the vertical frame part 5A.

Furthermore, in the vehicle body front part structure 1, the reinforcement member 170 is divided depending on the left and right fixation parts of the hood lock bracket 180.

Specifically, the portion of the first lateral frame part 5B between the first plate part 171 and the second plate part 172 serves as the vulnerable portion. It is therefore possible to inhibit the first lateral part 5B from hindering the rearward collapse of the vertical frame part 5A due to collision of the vehicle, and to operate the collision detection sensor 250 accurately.

REFERENCE SIGNS LIST 10 vehicle (vehicle body front part structure)
11 front side frame
11a front end part
13 front bumper beam
17b through-hole (fixation part)
19 gusset (second load receiving surface)
20 front bulkhead
30 lateral frame part
40 vertical frame part
40A lower vertical frame part
40B upper vertical frame part
40C boundary part
41b through-hole (fixation part)
50 reinforcement member
70 first load transmission member (first load receiving surface)
90 second load transmission member
91 hat cross-sectional part
91a upper brim part
91b lower brim part
91c crown part
100 collision detection sensor
110 protector
140 power unit
C center
1 vehicle body front part structure
2 front side frame
5 front bulkhead
5A vertical frame part
5B first lateral frame part
5Ba opening
5Bb hole part (radiator hose insertion hole)
5C second lateral frame part
150 rear-side member
152a relief part
160 front-side member
160a relief part
165 recess part
170 reinforcement member
171 first plate part
172 second plate part
172c relief part
180 hood lock bracket (hood lock)
181 one vehicle-width-direction end part (fixation part)
182 other vehicle-width-direction end part (fixation part)
190 hung member
191 main body part
192 flange part
200 lower member
210 lid member
B bolt
R radiator
RH radiator hose

The invention claimed is:

1. A vehicle body front part structure comprising:
 a pair of left and right front side frames extending in a vehicle front-rear direction; and
 a front bulkhead connected to front end portions of the front side frames, wherein
 the front bulkhead includes
  a pair of upper and lower lateral frame parts extending in a left-right direction, and
  a pair of left and right vertical frame parts extending in an upper-lower direction to connect vehicle-width-direction outer end portions of the lateral frame parts,
 the vertical frame parts are each formed by connecting a lower vertical frame part arranged on a lower side, and an upper vertical frame part arranged above the lower vertical frame part,
 the lower vertical frame part is fixed to the front end portion of the corresponding front side frame, and
 a load transmission member projecting further toward a vehicle front than the upper vertical frame part, and a collision detection sensor arranged higher than the load transmission member are fixed to the upper vertical frame part.

2. The vehicle body front part structure according to claim 1, wherein
 the vertical frame parts are each a hollow member, and a hollow cross-sectional area of the upper vertical frame part which is orthogonal to an extension direction of the upper vertical frame part is formed smaller than a hollow cross-sectional area of the lower vertical frame part which is orthogonal to an extension direction of the lower vertical frame part.

3. The vehicle body front part structure according to claim 2, wherein the load transmission member includes a hat cross-sectional part which has a hat shape in a cross-sectional view in the upper-lower direction, the hat cross-sectional part includes a pair of upper and lower brim parts fixed to the upper vertical frame part, and a crown part arranged between the pair of brim parts, and located away from the upper vertical frame part, and the hat cross-sectional part is arranged extending in the vehicle front-rear direction in a way that makes the crown part face a center of a hollow portion of the upper vertical frame part.

4. The vehicle body front part structure according to claim 1, wherein the load transmission member has a substantially L shape in a plan view, and an attachment seat surface, extending in the vehicle width direction, to which to attach another part is formed in a front end portion of the load transmission member.

5. The vehicle body front part structure according to claim 4, further comprising a protector which has an L shape in a side view, wherein the collision detection sensor is fixed to a vehicle-width-direction inner side wall of the upper vertical frame part, and the protector is fixed to the vehicle-width-direction inner side wall of the upper vertical frame part at a position upper or lower than the collision detection sensor, and is located closer to the vehicle front than the collision detection sensor.

6. The vehicle body front part structure according to claim 5, further comprising a reinforcement member interposed between the lower vertical frame part and the front end portion of the front side frame.

7. The vehicle body front part structure according to claim 6, wherein a lower end portion of the vertical frame part is inserted into and fixed to the vehicle-width-direction outer end portion of the lateral frame part.

8. The vehicle body front part structure according to claim 7, further comprising a front bumper beam arranged closer to the vehicle front than the load transmission member.

9. The vehicle body front part structure according to claim 8, wherein a first load receiving surface located outward of the front side frame in the vehicle width direction is provided in a lower end portion of the front bulkhead, and a second load receiving surface bulging outward in the vehicle width direction is provided on an outer surface of the front end portion of the front side frame.

10. The vehicle body front part structure according to claim 1, wherein the front bulkhead includes the pair of left and right vertical frame parts attached to the front end portions of the front side frames, and a first lateral frame part included in the lateral frame part, and detachably hung between upper end portions of the pair of left and right vertical frame parts, a relief part being formed in the first lateral frame part, the relief part being a cut which has an opening open downward, the vehicle body front part structure further comprising:

a hung member capable of opening and closing the opening of the relief part, and forming a radiator hose insertion hole between the hung member and the relief part;

a hood lock attached to the first lateral frame part; and a reinforcement member for reinforcing attachment parts of the first lateral frame part to which the relief part and the hood lock are attached.

11. The vehicle body front part structure according to claim 10, wherein the first lateral frame part includes a rear-side member integrally including an upper wall part, and a rear wall part extending downward from a rear end portion of the upper wall part, and a front-side member forming a closed cross section in cooperation with the rear-side member, a recess part is formed in the front-side member in a way that a radiator is accommodated under the front-side member, the hood lock is fixed to the rear wall part, and the reinforcement member reinforces the upper wall part and the rear wall part.

12. The vehicle body front part structure according to claim 10, wherein the first lateral frame part includes a rear-side member integrally including an upper wall part, and a rear wall part extending downward from a rear end portion of the upper wall part, and a front-side member forming a closed cross section in cooperation with the rear-side member, the hung member integrally includes a main body part extending between two ends of the opening of the relief part, and a flange part extending in a vehicle forward or rearward direction from a lower end portion of the main body part, and the hung part is hung from the reinforcement member in a way that makes the hung part close the opening of the relief part.

13. The vehicle body front part structure according to claim 10, further comprising a second lateral frame part included in each of the lateral frame parts, located lower than the first lateral frame part, and hung between the pair of left and right vertical frame parts, wherein an attachment part to which to attach an upper end portion of a radiator is formed in the first lateral frame part, and an attachment part to which to attach a lower end portion of the radiator is formed in the second lateral frame part.

14. The vehicle body front part structure according to claim 10, wherein the first lateral frame part includes a rear-side member integrally including an upper wall part, and a rear wall part extending downward from a rear end portion of the upper wall part, and a front-side member forming a closed cross section in cooperation with the rear-side member, in each of left and right end portions of the first lateral frame part, an opening in which to insert the upper end portion of the vertical frame part is formed between the front-side member and the rear-side member, an upper end portion of a front wall part of the vertical frame part is bolted to the front-side member, and an upper end portion of a rear wall part of the vertical frame part is bolted to the rear-side member.

15. The vehicle body front part structure according to claim 11, wherein
the collision detection sensor for detecting collision of a vehicle is attached to the vertical frame part,
the hood lock is fixed to the rear-side member in each of left and right end portion of the hood lock,
the reinforcement member is divided into
a first plate part for reinforcing one of left and light fixation parts of the hood lock, and
a second plate part for reinforcing surroundings of another of the left and light fixation parts of the hood lock, and the relief part, and
the first plate part and the second plate part are away from each other.

\* \* \* \* \*